(12) United States Patent
Marumoto et al.

(10) Patent No.: US 10,554,118 B2
(45) Date of Patent: Feb. 4, 2020

(54) POWER SUPPLY DEVICE

(71) Applicant: Rohm Co., Ltd., Kyoto (JP)

(72) Inventors: Kyoji Marumoto, Kyoto (JP); Akeyuki Komatsu, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 16/015,405

(22) Filed: Jun. 22, 2018

(65) Prior Publication Data
US 2018/0375422 A1 Dec. 27, 2018

(30) Foreign Application Priority Data

Jun. 22, 2017 (JP) .................................. 2017-122183
Jun. 20, 2018 (JP) .................................. 2018-116962

(51) Int. Cl.
*H02M 1/42* (2007.01)
*H02M 1/14* (2006.01)
*H02M 7/06* (2006.01)

(52) U.S. Cl.
CPC ......... *H02M 1/143* (2013.01); *H02M 1/4208* (2013.01); *H02M 7/06* (2013.01)

(58) Field of Classification Search
CPC ....... H02M 1/143; H02M 1/4208; H02M 7/06
See application file for complete search history.

(56) References Cited

U.S. PATENT DOCUMENTS

| 8,018,279 | B2 * | 9/2011 | Honda | H03F 3/2173 |
| | | | | 330/207 A |
| 9,318,971 | B2 * | 4/2016 | Yamahira | H02M 5/293 |
| 2012/0201065 | A1 | 8/2012 | Nate et al. | |
| 2014/0112043 | A1 * | 4/2014 | Yamahira | H02M 5/293 |
| | | | | 363/127 |
| 2016/0099647 | A1 * | 4/2016 | Zhang | H02M 3/33569 |
| | | | | 363/21.12 |
| 2016/0233777 | A1 * | 8/2016 | Murakami | H02M 3/33561 |
| 2017/0237354 | A1 * | 8/2017 | Takahara | H02M 3/28 |
| | | | | 363/17 |

FOREIGN PATENT DOCUMENTS

| JP | 2012-182968 | 9/2012 |
| JP | 2016-046045 | 4/2016 |

* cited by examiner

*Primary Examiner* — Jue Zhang
*Assistant Examiner* — Kevin H Sprenger
(74) *Attorney, Agent, or Firm* — Fish & Richardson P.C.

(57) ABSTRACT

A power supply device has a switch and a coil connected in series with alternating-current input power. A first rectifier connected across the coil performs boost rectification, and a voltage across an output smoothing capacitor is charged to obtain output power.

5 Claims, 32 Drawing Sheets

POWER SUPPLY DEVICE

CROSS-REFERENCE TO RELATED APPLICATIONS

This nonprovisional application claims priority under 35 U.S.C. § 119(a) on Japanese Patent Applications listed below.
(1) No. 2017-122183 filed on Jun. 22, 2017
(2) No. 2018-116962 filed on Jun. 20, 2018

BACKGROUND OF THE INVENTION

Field of the Invention

The invention disclosed in this specification relates to a power supply device.

Description of Related Art

A power supply device that uses commercial AC power as its input is usually equipped with a power factor improvement circuit for eliminating phase difference between an input current waveform and an input voltage waveform.

Conventional circuits of this type have a structure in which in order to boost and rectify the input current proportional to the input voltage of the commercial AC power source, the input voltage is rectified by a first rectifier and an input smoothing capacitor, and then a switching element and a coil cause the current to flow, and another second rectifier connected to an output terminal boosts and rectifies coil exciting current generated when the switch is turned off.

Note that as an example of a conventional technique related to the above description, there are JP-A-2012-182968 and JP-A-2016-046045.

Conventional circuits have the following problems. One is that large rush current flows in the input smoothing capacitor or the first rectifier when the power is turned on. Another problem is that when a rated voltage of the commercial AC power source is low, supplied current to the input smoothing capacitor is increased so that heat generation in the first rectifier is increased while power efficiency is deteriorated. Still another problem is that when the rated voltage of the commercial AC power source is high, despite of resonance control of drain voltage of the switching element, voltage across terminals of the switching element does not become zero, and zero-voltage switching cannot be performed resulting in deterioration of power efficiency.

FIG. 1 shows a conventional power supply device 100 having a power factor improvement function (so-called power factor correction (PFC) function). A circuit structure and operation of the power supply device 100 illustrated in FIG. 1 are described below.

In the power supply device 100 of FIG. 1, AC1 denotes an alternating-current input power, BD2 denotes a rectifier having a diode bridge structure, C3 denotes an input smoothing capacitor, L4 denotes a coil, D5 denotes a rectifier (rectifying diode) constituted of a fast recovery diode, SW6 denotes a switching element constituted of an N-channel high-voltage MOSFET, D12 denotes a body diode of SW6 or a diode disposed in parallel to the switching element SW6, C10 denotes a capacitor that suppress noise and switching heat generation, Isens11 denotes a current detector constituted of a resistor and a comparator, C7 denotes an output smoothing capacitor, Load8 denotes an output load, CTRL9 denotes a control circuit that controls switching operation of the switching element SW6.

The rectifier BD2 of the diode bridge structure has a structure illustrated in FIG. 2 in which diodes D21, D22, D23, and D24 are connected in a bridge configuration. The coil L4 can have a structure of a single coil L illustrated in FIG. 3. The output load Load8 is incorporated in the power supply device 100 in FIG. 1, but in reality it is a load of another device connected to the output of the power supply device 100, and is shown as a resistance load Ro as illustrated in FIG. 4 for convenience sake. The current detector Isens11 can have a structure constituted of a resistor Rsens and a comparator CmpSens as illustrated in FIG. 5.

The control circuit CTRL9 that controls switching operation of the switching element SW6 can have a structure illustrated in FIG. 6. In FIGS. 6, R1 and R2 denote resistors. Rf and Cf denote a resistor and a capacitor, respectively. Vref1 denotes a reference voltage for controlling output voltage Vout of the power supply device 100 to be constant. Amp1 denotes an operational amplifier. Cmp1 denotes a comparator. SawGen denotes a sawtooth wave generation circuit. OneShot denotes a one-shot pulse generation circuit that generates a pulse in synchronization with an input edge change, after a predetermined period of time. FFrs denotes an RS flip-flop with a reset/set input. Buf1 denotes a buffer that drives the switching element SW6.

Note that the comparator Cmp1, the operational amplifier Amp1, the one-shot pulse generation circuit OneShot, the RS flip-flop FFrs, and the sawtooth wave generation circuit SawGen need driving power supplies. As structures of the driving power supplies, there are considered various structures such as a structure of supplying from the alternating-current input power AC1, a structure of supplying from the output voltage Vout of the power supply device 100, and a structure of supplying from an external device other than the power supply device 100. In all following descriptions, illustrations in diagrams, and displays, it is supposed that appropriate driving power supplies are provided, though they are not described or illustrated.

In the conventional example illustrated in FIG. 1, rush current when the power is turned on is described. In the state just before the power supply device 100 is supplied with the alternating-current input power AC1, voltage Vin across terminals of the input smoothing capacitor C3 (hereinafter referred to as input voltage Vin) is 0 V, voltage across terminals of the output smoothing capacitor C7, i.e. the output voltage Vout is also 0 V. When the alternating-current input power AC1 is turned on, AC input voltage Vac is supplied in a sine waveform. It is supposed that forward voltages of the diodes D21 to D24 constituting the rectifier BD2 are all Vf2, and even if phase of the AC input voltage Vac starts from zero, when the AC input voltage Vac becomes Vf2×2 or higher, it is rectified by the rectifier BD2 and charges the input smoothing capacitor C3. When the input voltage Vin increases and becomes higher than forward voltage Vf5 of the rectifying diode D5, the input voltage Vin is rectified by the rectifying diode D5 and charges the output smoothing capacitor C7.

FIG. 7 illustrates the manner described above. The rush current has a surge current component flowing for first charging the input smoothing capacitor C3, and a current component flowing in a direct charging path from the alternating-current input power AC1 to the output smoothing capacitor C7, when a relationship of the following expression (1) is satisfied for the charge voltage of the output smoothing capacitor C7 (i.e. the output voltage Vout).

$$Vout < Vac\_Pack - 2 \times Vf2 - Vf5 \qquad (1)$$

In the period satisfying the above expression (1), the boost rectification operation of the output smoothing capacitor C7 by the switching operation is usually not performed, because there is the direct charging path from the alternating-current input power AC1 to the output smoothing capacitor C7 as described above. The switching operation is started after time t0 in FIG. 7.

This rush current, in particular, surge rush current may deteriorate components and may deteriorate reliability of the power supply device 100. When a current filter device is added as a countermeasure against the rush current, cost of the power supply device 100 is increased, and further the added device may cause a decrease in power efficiency.

Next, heat generation in the rectifier BD2 in the conventional example of FIG. 1 is described. It is supposed that the output load Load8 in FIG. 1 is 400 W. The power supply device 100 improves power factor by the boost rectification with the rectifying diode D5, and hence the output voltage Vout is required to satisfy the following expression (2).

$$Vout > Vac\_Peak - 2 \times Vf2 - Vf5 \qquad (2)$$

If specification of the power supply device 100 supports all commercial AC power sources in the world, Vac_Peak=240×√2=339.4 V is the peak voltage in the highest rated voltage standard. Therefore, considering variation margin in the rated voltage and other factors, the output voltage Vout in stationary condition is usually set to approximately 400 V. The supplied current to the output load Load8 is required to be 400 W/400 V=1 A, and diode loss (heat generation) in the rectifying diode D5 is 1 A×1 V=1 W when the diode having Vf5=1 V is selected.

On the other hand, current flowing in the rectifier BD2 is 400 W/240 V=1.67 A, because the rated voltage is 240 V. Therefore, if the diode having Vf2=1 V is selected, for example, heat generation is 1.67 A×2×1V=3.34 W. The problem in the power supply device 100 supporting all commercial AC power sources in the world is the heat generation in the rectifier BD2 when the rated voltage is low. The lowest rated voltage is 100 V, and the heat generation in this case is 400 W/100 V×2×1 V=8 W estimating in the same manner as described above, so the heat generation in the rectifier BD2 is 8 times the heat generation in the rectifying diode D5. There are problems that the heat generation causes a decrease in power conversion efficiency, and that downsizing of the power supply device 100 is restricted due to countermeasures against heat generation.

Next, as described below, in the conventional example of FIG. 1, when the rated voltage of the alternating-current input power AC1 is high, zero-voltage switching of the switching element SW6 cannot be performed, and hence power efficiency is decreased. It is supposed that power requested by the output load Load8 is being steadily supplied. In general, as illustrated in FIG. 8, the power supply device 100 having the power factor improvement function can be controlled in three operation modes, which are a continuous mode in which AC1 current flows constantly, an intermittent mode in which the AC1 current flows intermittently, and a critical mode that is boundary between the continuous mode and the intermittent mode.

In order to describe switching losses of the switching element SW6 in the individual operation modes, FIGS. 9A to 9C illustrate schematic diagrams of time series waveforms of a gate voltage of SW6, a voltage Vd across terminals of SW6, current Isw6 across terminals of SW6, and a loss of SW6, in the individual operation modes.

The continuous mode of FIG. 9A is described. At time Toff1 when the switching element SW6 is switched from on to off, the current Isw6 across terminals of SW6 is maximum, and the gate voltage of SW6 is changed from on-voltage to off-voltage. A period from time Toff1 to time Toff2 is a turn-off transition time of the switching element SW6. During this period, charging of the noise-switching heat generation suppressing capacitor C10 causes slower increase of the voltage Vd across terminals of SW6, so that the loss of SW6 (=Vd×Isw6) is suppressed. When the switching element SW6 is completely turned off, the current Isw6 across terminals of SW6 when the turning off starts gives resonance energy for the noise-switching heat generation suppressing capacitor C10, a parasitic capacitance of the switching element SW6, and the coil L4, so that the voltage Vd across terminals of SW6 is increased. When the voltage Vd across terminals of SW6 becomes Vout+Vf5, rectification is performed by the rectifying diode D5, and charging of the output smoothing capacitor C7 is started. Next, at time Ton1 when the switching element SW6 is turned on, the rectification by the rectifying diode D5 is still performed in the continuous mode, and hence offset current Ioffset due to excitation energy continues to flow in the coil L4. When the switching element SW6 is turned on, it must allow the offset current Ioffset to flow, and further must allow the voltage Vd across terminals of SW6 to decrease from Vout+Vf5 to a GND level. Therefore, the voltage Vd across terminals of SW6 decreases mildly, and the current Isw6 across terminals of SW6 increases mildly up to the offset current Ioffset. As a result, the loss of SW6 is increased during a period from time Ton1 to time Ton2.

Next, the critical mode of FIG. 9B is described. The switching loss at timing when the switching element SW6 is switched from on to off is the same as that in the continuous mode. Next, at time Ton1 when the switching element SW6 is turned on, rectification by the rectifying diode D5 is finished so that charging current for the output smoothing capacitor C7 becomes zero. This timing is denoted by "Trecend" in FIGS. 9B and 9C, and the control circuit CTRL9 can recognize the timing "Trecend" by detecting current change with the current detector Isens11. Note that time Ton1 and the timing "Trecend" are the same timing in the critical mode. The period from time Ton1 to time Ton2 is a turn-on transition time of the switching element SW6. During this period, the noise-switching heat generation suppressing capacitor C10 is discharged, and hence the switching element SW6 is turned on while consuming current. In this case, the switching element SW6 outputs only charging energy for the noise-switching heat generation suppressing capacitor C10 so that the voltage Vd across terminals of SW6 is decreased from Vout+Vf5 to the GND level, and hence the voltage Vd across terminals of SW6 is rapidly decreased so that the current Isw6 across terminals of SW6 becomes only discharging current for the noise-switching heat generation suppressing capacitor C10. As a result, the loss of SW6 is smaller than that in the continuous mode although it is increased in the period from time Ton1 to time Ton2.

Next, the intermittent mode of FIG. 9C is described. The switching loss at timing when the switching element SW6 is switched from on to off is the same as that in the continuous mode. Next, the rectified current by the rectifying diode D5 is zero at the timing "Trecend" before time Ton1 when the switching element SW6 is turned on, and hence the control circuit CTRL9 can recognize the timing "Trecend" by detecting current change with the current detector Isens11. After the timing "Trecend", the voltage Vd across terminals of SW6 is decreased due to resonance of the noise-switching heat generation suppressing capacitor C10, the parasitic capacitance of the switching element SW6, and the coil L4. Note that resonant period Tres is calculated using the following equation (3). In the equation (3), Csw6 denotes the parasitic capacitance of the switching element SW6.

$$Tres = 2\pi\sqrt{\{L4(C10+Csw6)\}} \quad (3)$$

Therefore, using the current detector Isens11, after a period (=Tres/2) that is ½ of the resonant period Tres elapses from the timing when the end of rectification by the rectifying diode D5 is detected, the switching element SW6 is turned on, and thus the zero-voltage switching can be realized so that the loss due to on-resistance of the switching element SW6 is substantially zero.

After the rectification by the rectifying diode D5 is finished in the intermittent mode, the voltage Vd across terminals of SW6 is resonated. In this case, the voltage Vd across terminals of SW6 generates a resonance voltage waveform with reference to the input voltage Vin as illustrated in FIG. 10. Therefore, when the input voltage Vin is low as illustrated in FIG. 10, the voltage Vd across terminals of SW6 reaches GND so that the zero-voltage switching can be performed. To be strict, when the switching element SW6 has the body diode D12, the period in which the zero-voltage switching can be performed is a period in which the voltage Vd across terminals of SW6 is clamped by −Vf12 that is the forward voltage of the body diode D12, i.e. a period from time Tz1 to time Tz3. When the switching element SW6 does not have the body diode D12, the resonance waveform of the voltage Vd across terminals of SW6 extends to the negative side so that reverse current flows in the switching element SW6 when it is turned on, resulting in a loss. Therefore, the zero-voltage switching can be performed only at two time points of time Tz1 and time Tz2. On the other hand, when the input voltage Vin is high, the voltage Vd across terminals of SW6 does not decrease to GND, and hence the loss of SW6 when it is turned on by the zero-voltage switching cannot be zero. In other words, similarly to the critical mode, current flows when the switching element SW6 is turned on by the charging energy for the noise-switching heat generation suppressing capacitor C10 corresponding to the voltage Vd across terminals of SW6 when the switch is turned on, and hence a loss occurs. When trying to support all rated voltage standards in the world, this problem occurs if the rated voltage input voltage Vin is high.

One object of the invention disclosed in this specification is to improve power conversion efficiency, and the intermittent mode described above is shown as a conventional example, as an operation mode in which a loss when the switching element SW6 is turned on can be reduced. Also for the control circuit CTRL9 of the conventional example, operation in the above-mentioned intermittent mode is described. In addition, signal timings are shown in FIG. 11.

In FIG. 6 illustrating the structural example of the control circuit CTRL9, an input terminal of the current detection pulse Vsens is connected to the current detector Isens11, when the rectified current finishes flowing in the rectifying diode D5 of the power supply device 100, the current detector Isens11 outputs the current detection pulse Vsens. A falling timing of the current detection pulse Vsens corresponds to Trecend in FIG. 11. When delay time Tres/2 expressed by the equation (3) described above elapses from the signal change described above, the one-shot pulse generation circuit OneShot generates a one-shot pulse (rising pulse) in a set signal Vset. The timing corresponds to time Ton1 in FIG. 11. The set signal Vset is input to a Set input terminal of the RS flip-flop FFrs so as to make a Q output of the RS flip-flop FFrs be logic level 1. The Q output is sent to the output terminal of a SWon signal via the buffer Buf1 and turns on the switching element SW6. In addition, when the Q output becomes logic level 1, a Start/Stop input terminal of the sawtooth wave generation circuit SawGen is supplied with logic level 1, and a sawtooth wave voltage Vsaw is generated.

On the other hand, a difference between the reference voltage Vref1 and a voltage obtained by dividing the output voltage Vout of the power supply device 100 by the resistors R1 and R2 is processed by an integral filter constituted of the operational amplifier Amp1, the capacitor Cf, and the resistor Rf, so that a control voltage Vcnt is generated. A relationship between the reference voltage Vref1 and the resistors R1 and R2 is expressed by the following equation (4). Note that in the equation (4), Vout_target denotes a set value (target value) of the output voltage Vout.

$$Vref1 = Vout\_target \times \{R2/(R1+R2)\} \quad (4)$$

The control voltage Vcnt is a voltage signal that determines an on-time of the switching element SW6 to make the output voltage Vout be the set value. The comparator Cmp1 outputs zero voltage as a reset signal Vreset that is input to a reset input terminal of the RS flip-flop FFrs until the sawtooth wave voltage Vsaw output from the sawtooth wave generation circuit SawGen becomes identical to the control voltage Vcnt, while it makes the reset signal Vreset be high level when the voltages become identical to each other, so that the Q output of the RS flip-flop FFrs becomes logic level 0. In addition, the sawtooth wave voltage Vsaw also becomes zero-voltage. This timing corresponds to time Toff1 in FIG. 11. The Q output of the logic level 0 turns off the switching element SW6 via the buffer Buf1. Note that in the power supply device 100, when the switching element SW6 is turned off so that the voltage Vd across terminals of SW6 increases to Vout+Vf2, the boost rectification is started via the rectifying diode D5.

When the rectified current finishes flowing in the rectifying diode D5, the current detector Isens11 outputs the current detection pulse Vsens, the state of waiting for the zero-voltage switching is restored again, and the control circuit CTRL9 repeats the control described above.

SUMMARY OF THE INVENTION

In view of the above-mentioned problem found by the inventor of this application, it is an object of the invention disclosed in this specification to provide a power supply device capable of suppressing rush current and improving efficiency.

For example, a power supply device disclosed in this specification includes a switch and a coil connected in series with an alternating-current input power, performs boost rectification with a first rectifier connected across terminals of the coil, and charges a voltage across terminals of the output smoothing capacitor so that output power is obtained.

Note that other features, elements, steps, advantages, and characteristics of the present invention will become more apparent from the description of the best mode embodiment given below and the related attached drawings.

DETAILED DESCRIPTION OF THE PREFERRED EMBODIMENTS

Now, the invention disclosed in this specification is described in detail with reference to various embodiments. Note that in all diagrams that are used for describing the embodiments, the same member is denoted by the same numeral or symbol so that overlapping description is omitted.

First Embodiment

Figure 3:
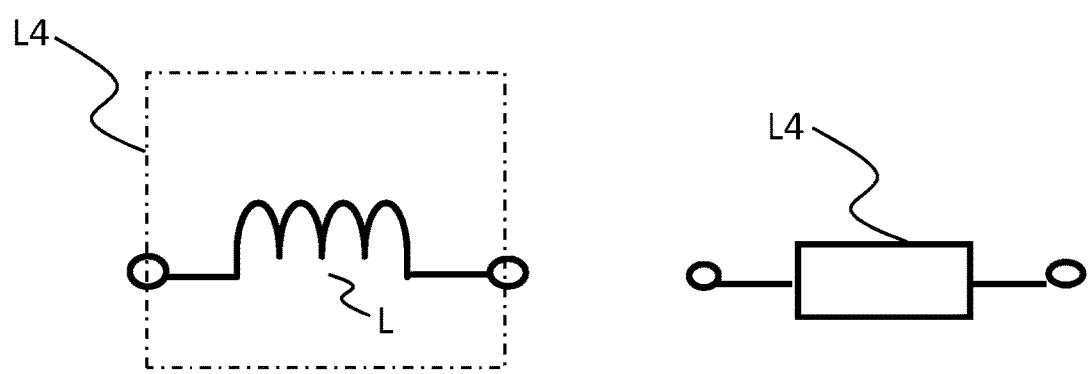
FIG. 3 is a diagram illustrating a structural example of a coil L4.
Figure 4:
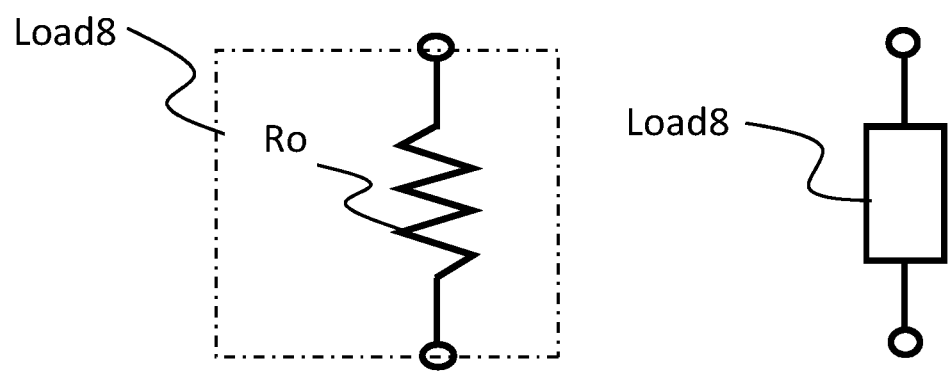
FIG. 4 is a diagram illustrating an equivalent circuit example of an output load Load8.
Figure 12:
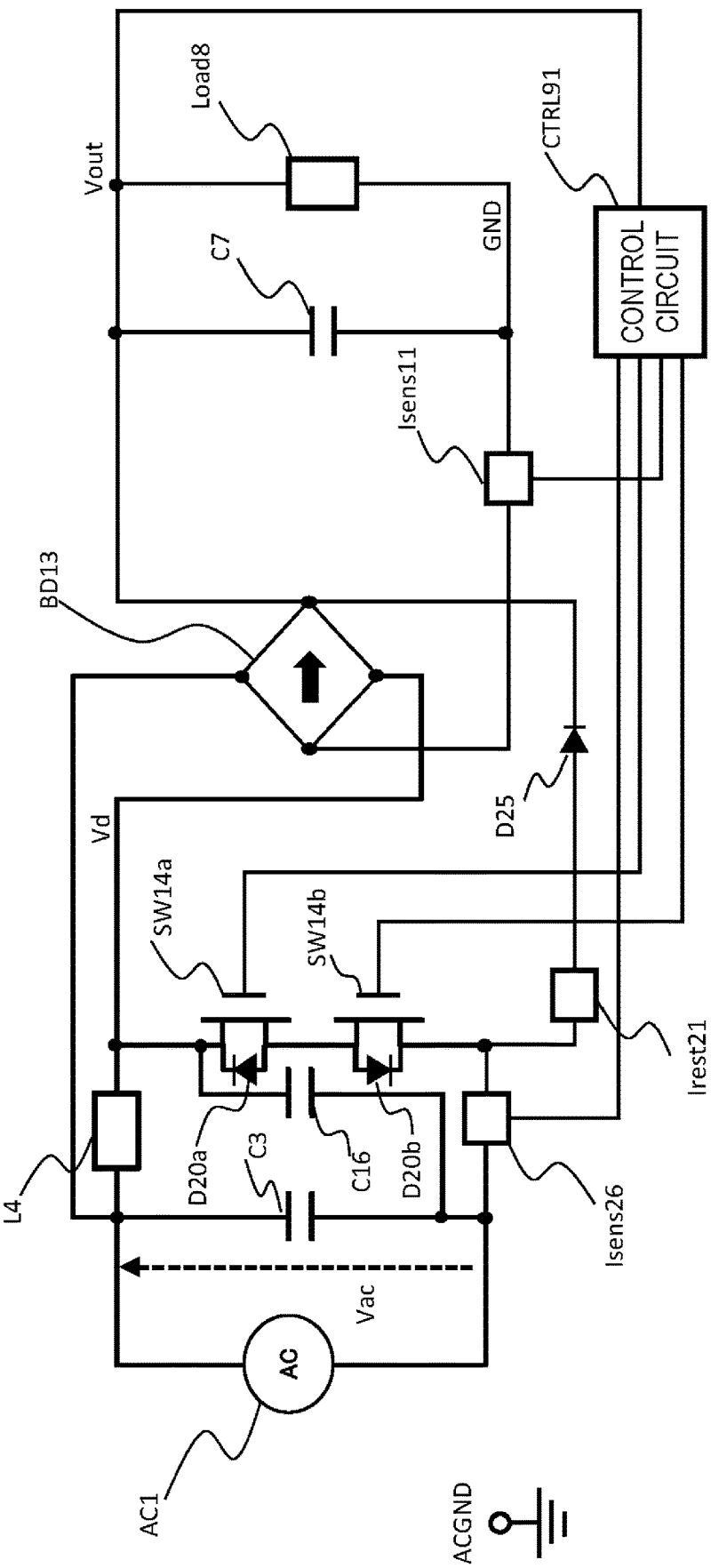
FIG. 12 is a diagram illustrating a power supply device 101 of a first embodiment.

FIG. 12 is a diagram illustrating a power supply device 101 according to a first embodiment of the present invention. AC1 denotes an alternating-current input power. C3 denotes an input smoothing capacitor. L4 denotes a coil, which can be constituted of a single coil L as illustrated in FIG. 3. C7 denotes an output smoothing capacitor. Load8 denotes an output load. FIG. 12 illustrates the output load Load8 incorporated in the power supply device 101, but in reality it is a load of another device connected to the output of the power supply device 101, and it is shown as a resistance load Ro illustrated in FIG. 4, for convenience sake.

Figure 5:
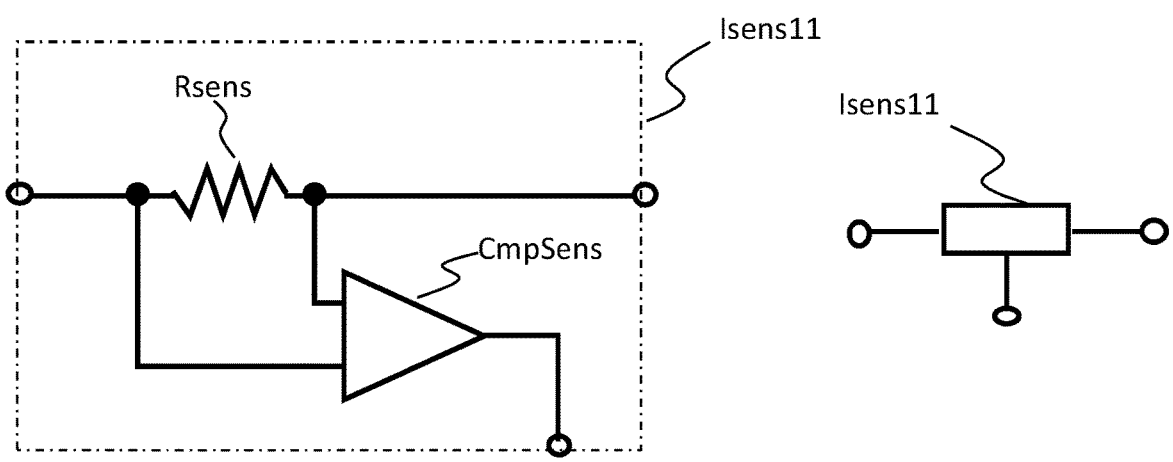
FIG. 5 is a diagram illustrating a structural example of a current detector Isens11.
Figure 6:
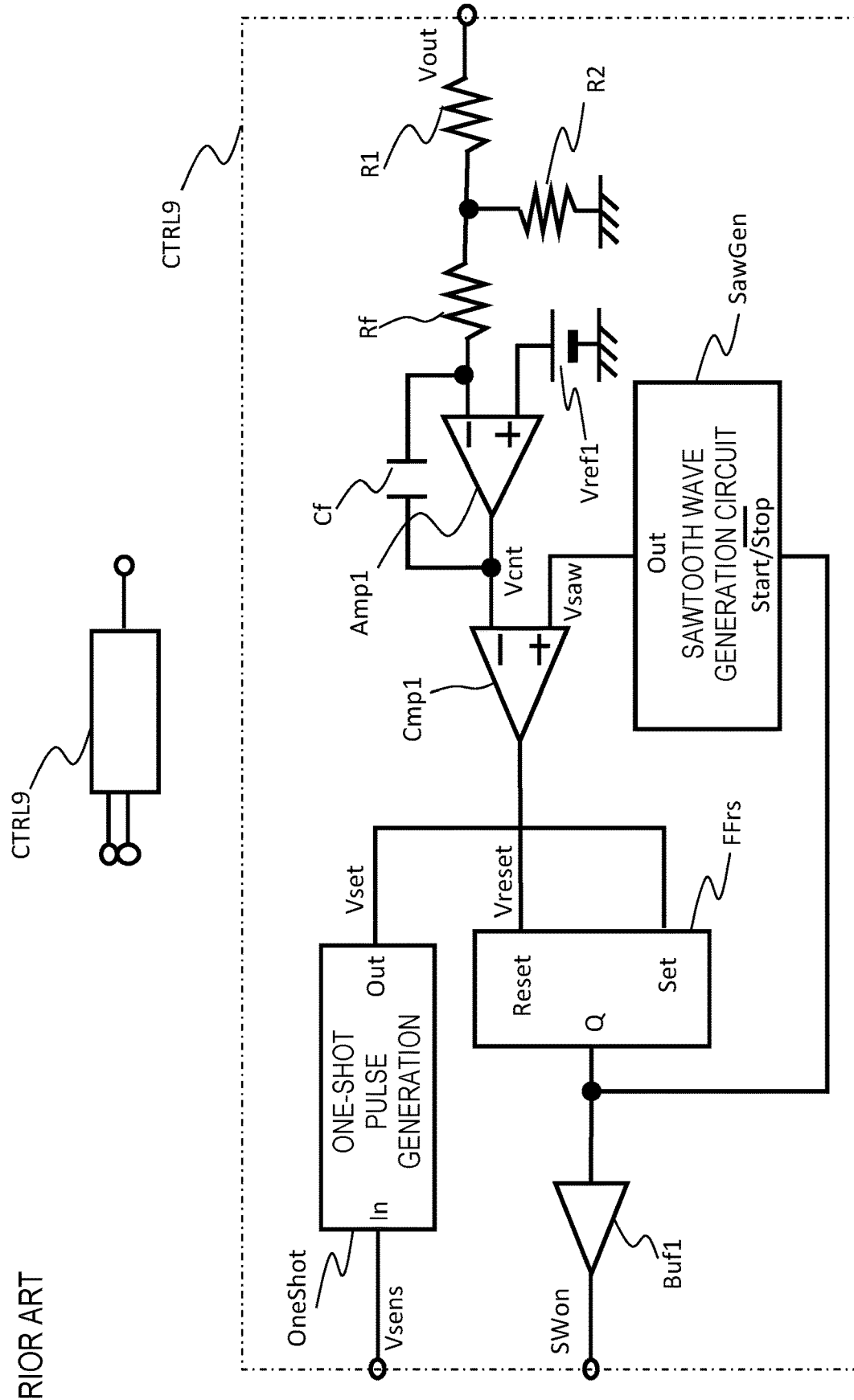
FIG. 6 is a diagram illustrating a structural example of a control circuit CTRL9.
Figure 7:
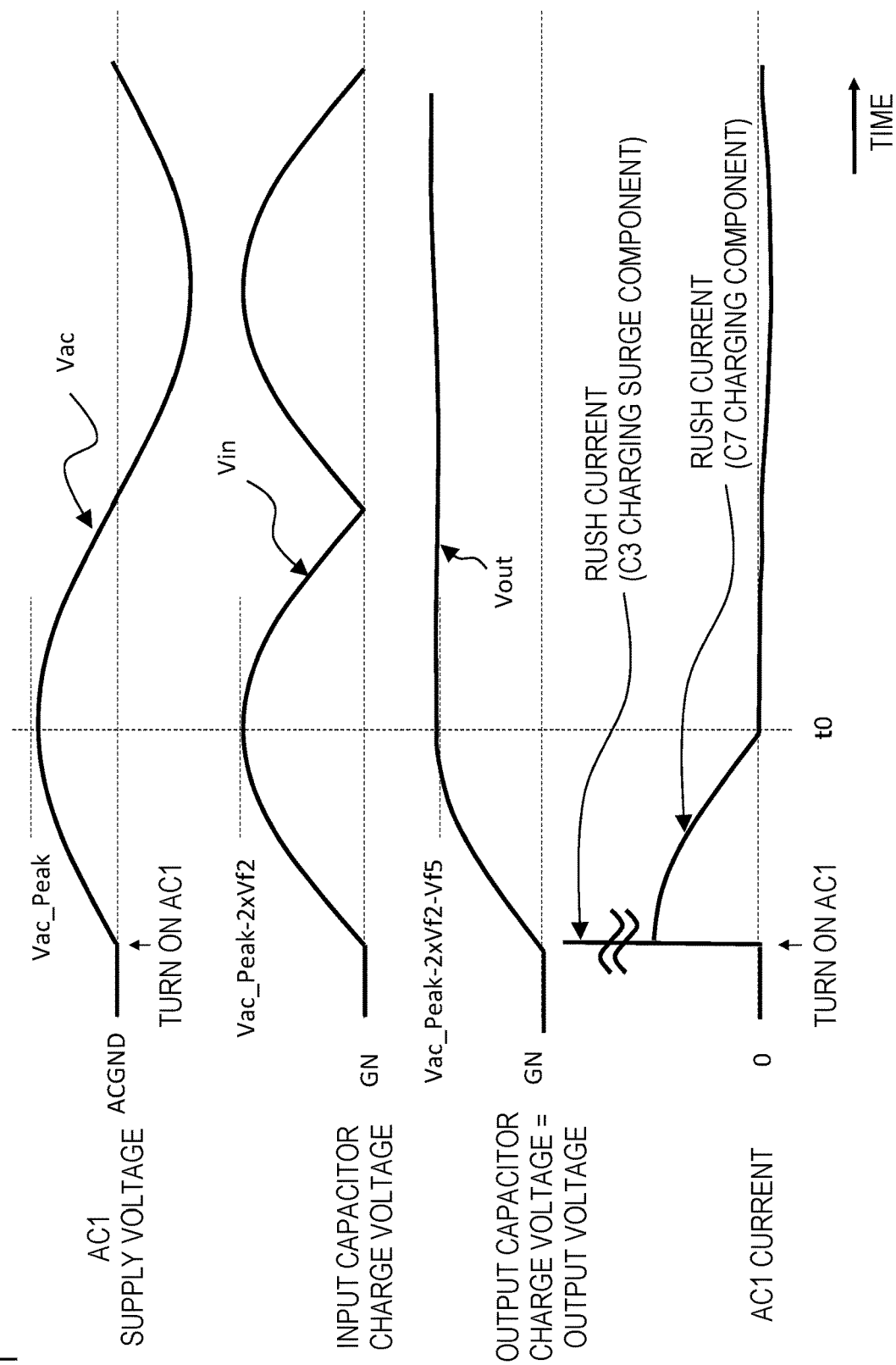
FIG. 7 is a waveform diagram illustrating a problem of rush current in a conventional example.
Figure 8:
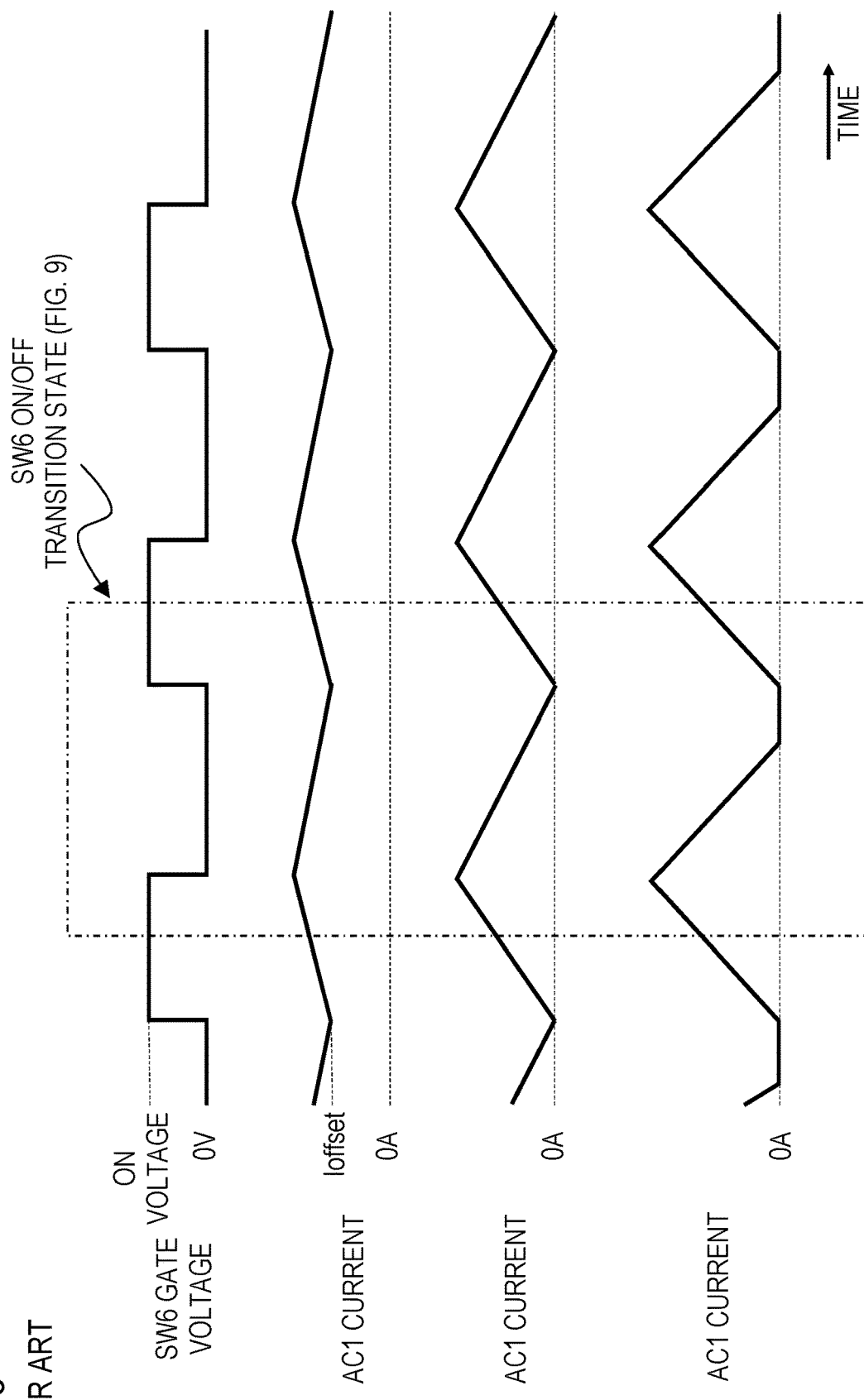
FIG. 8 is a diagram illustrating input current waveforms in individual operation modes of the power supply device 100.
Figure 9A:
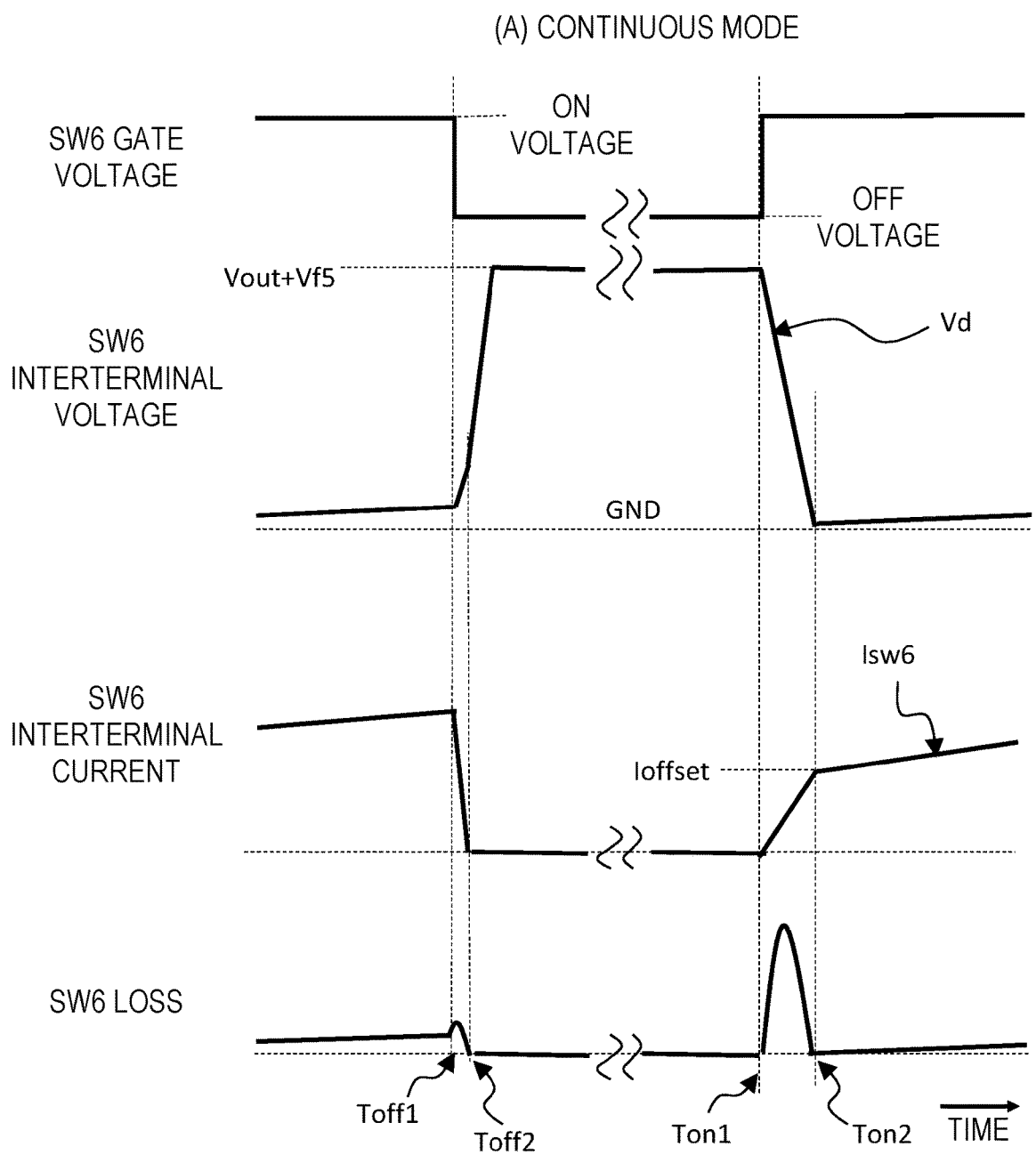
FIG. 9A is a waveform diagram illustrating a loss of a switching element SW6 in a continuous mode.
Figure 9B:
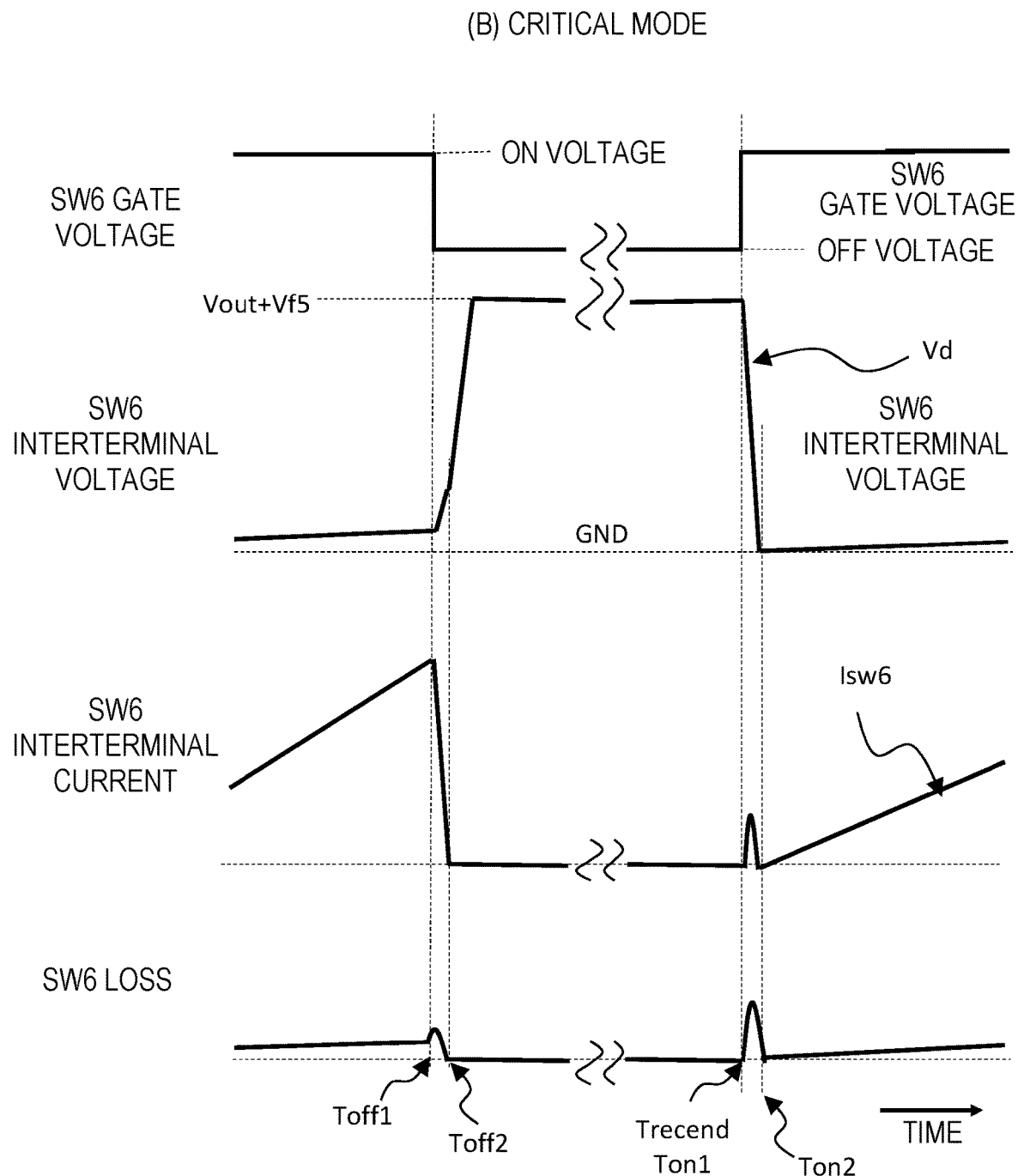
FIG. 9B is a waveform diagram illustrating a loss of the switching element SW6 in a critical mode.
Figure 9C:
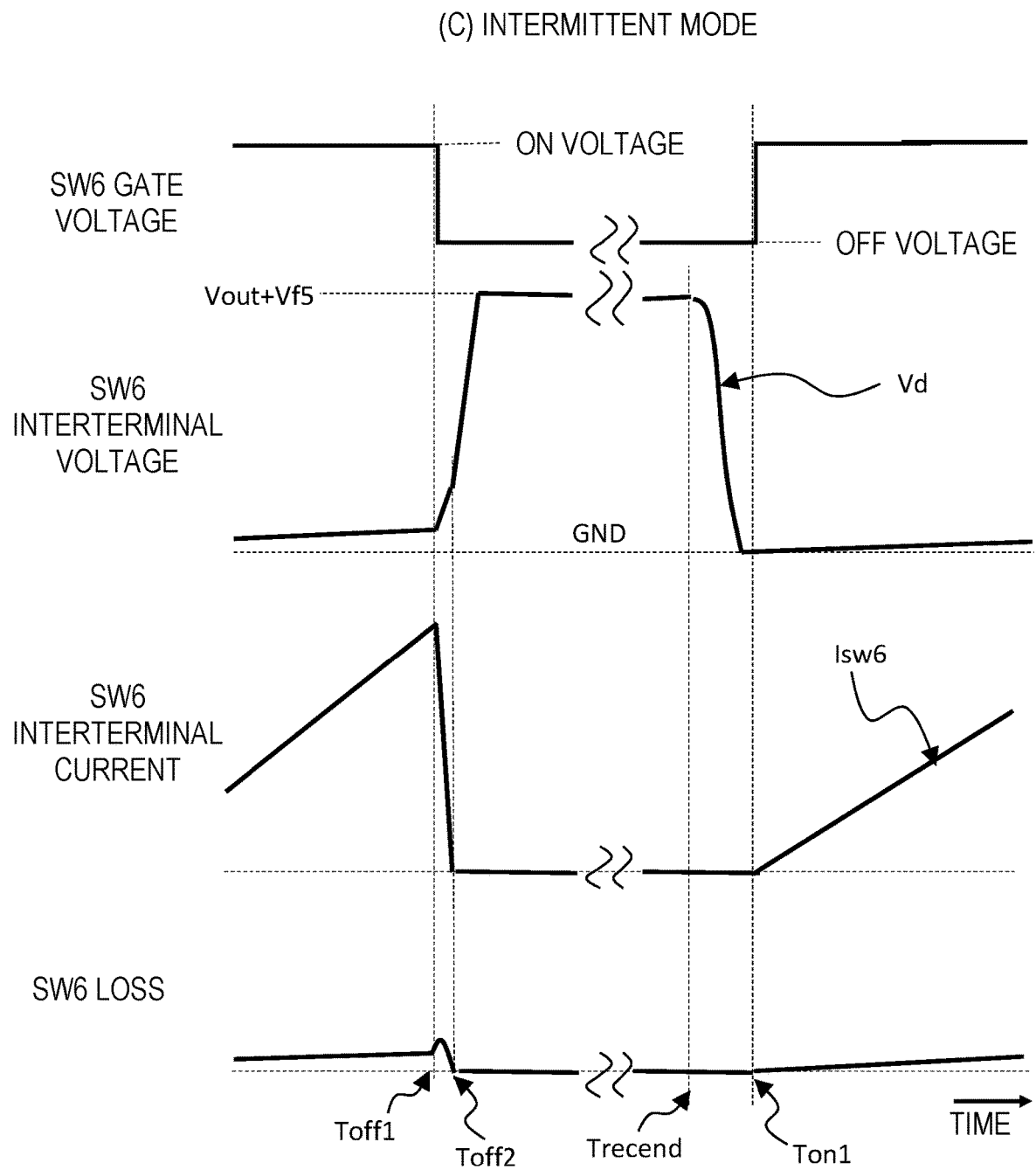
FIG. 9C is a waveform diagram illustrating a loss of the switching element SW6 in an intermittent mode.
Figure 10:
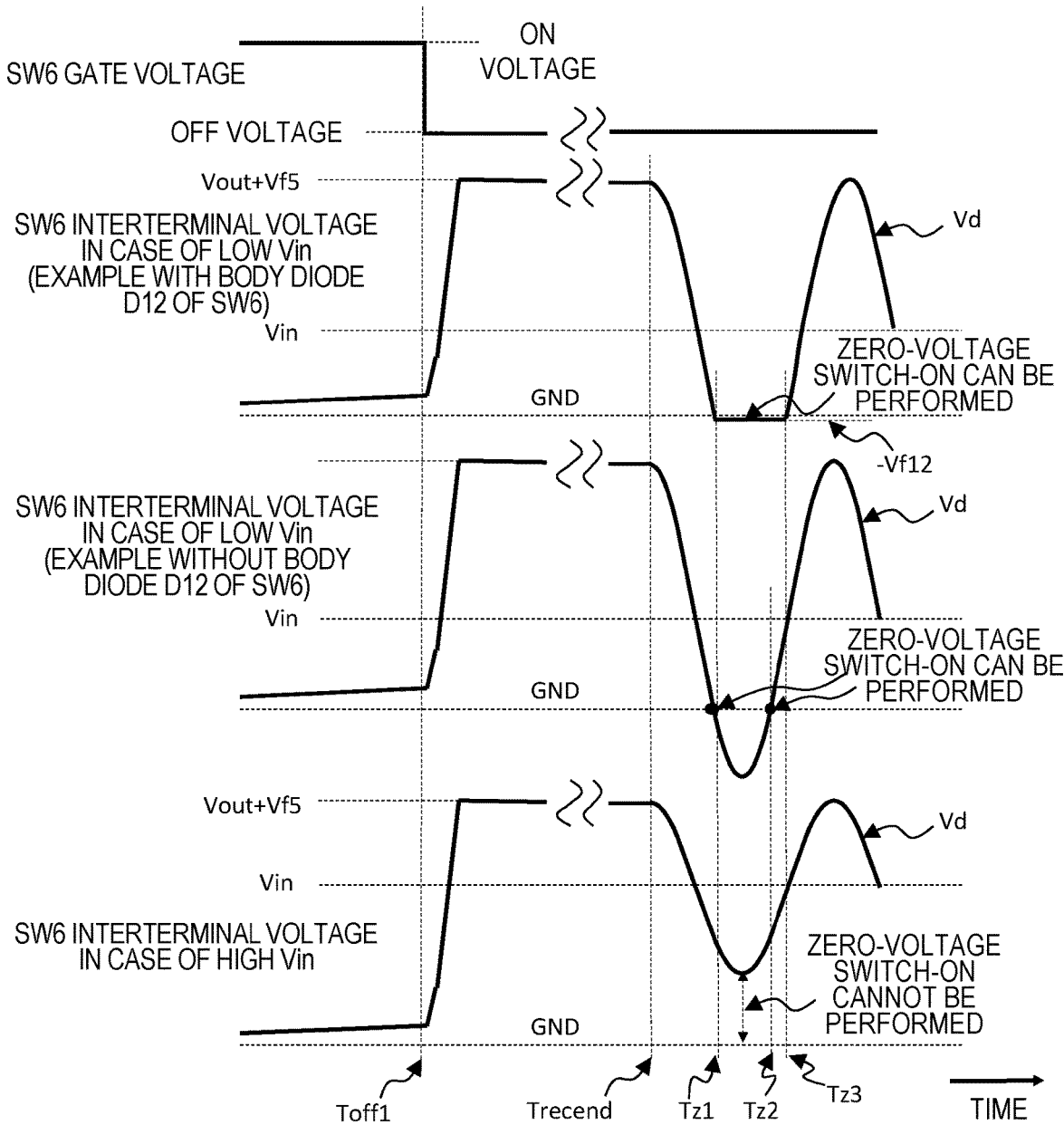
FIG. 10 is a waveform diagram illustrating a problem of zero-voltage switching when input voltage is low.
Figure 11:
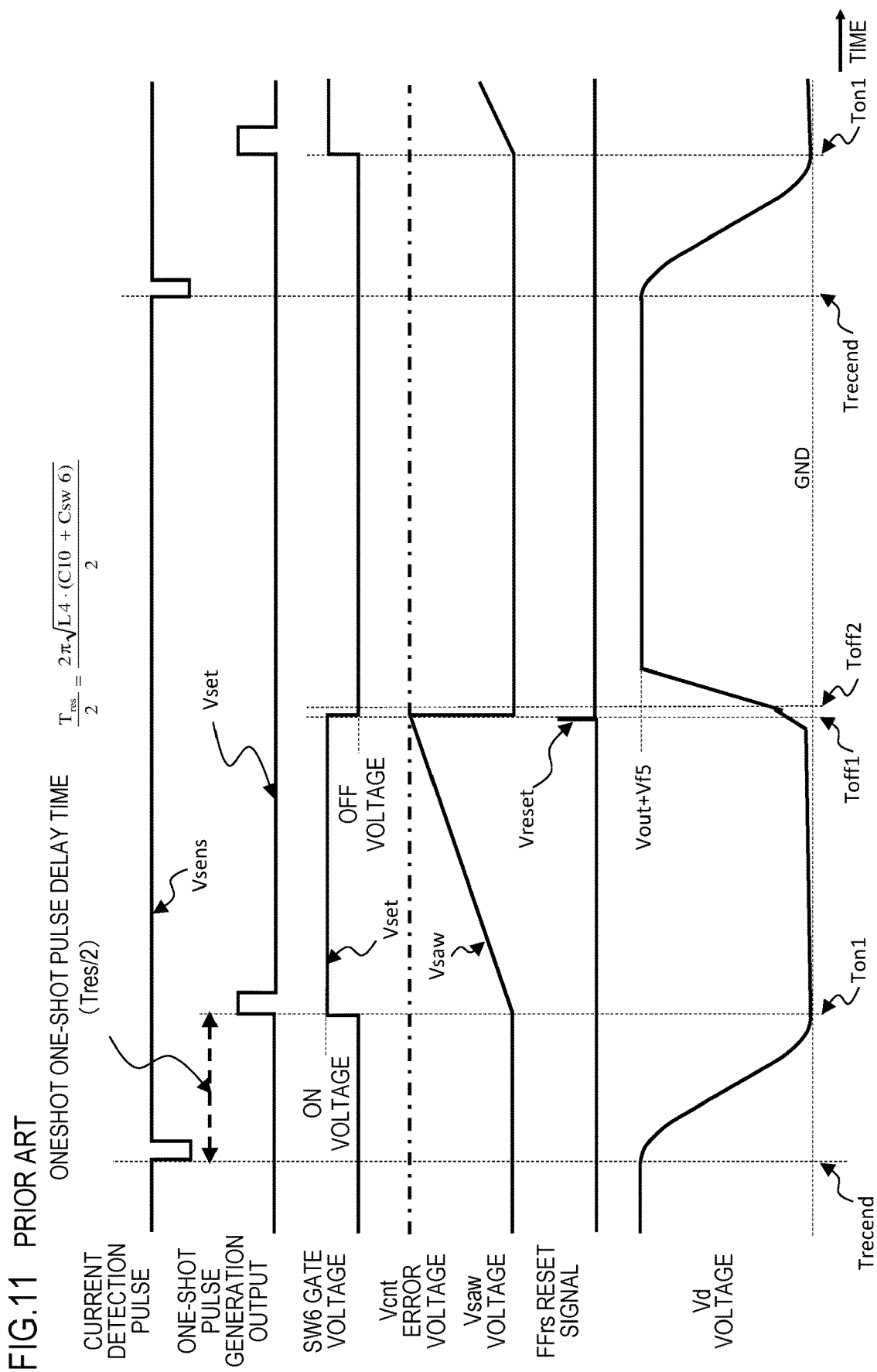
FIG. 11 is a waveform diagram illustrating a control operation of the control circuit CTRL9.
Figure 13:
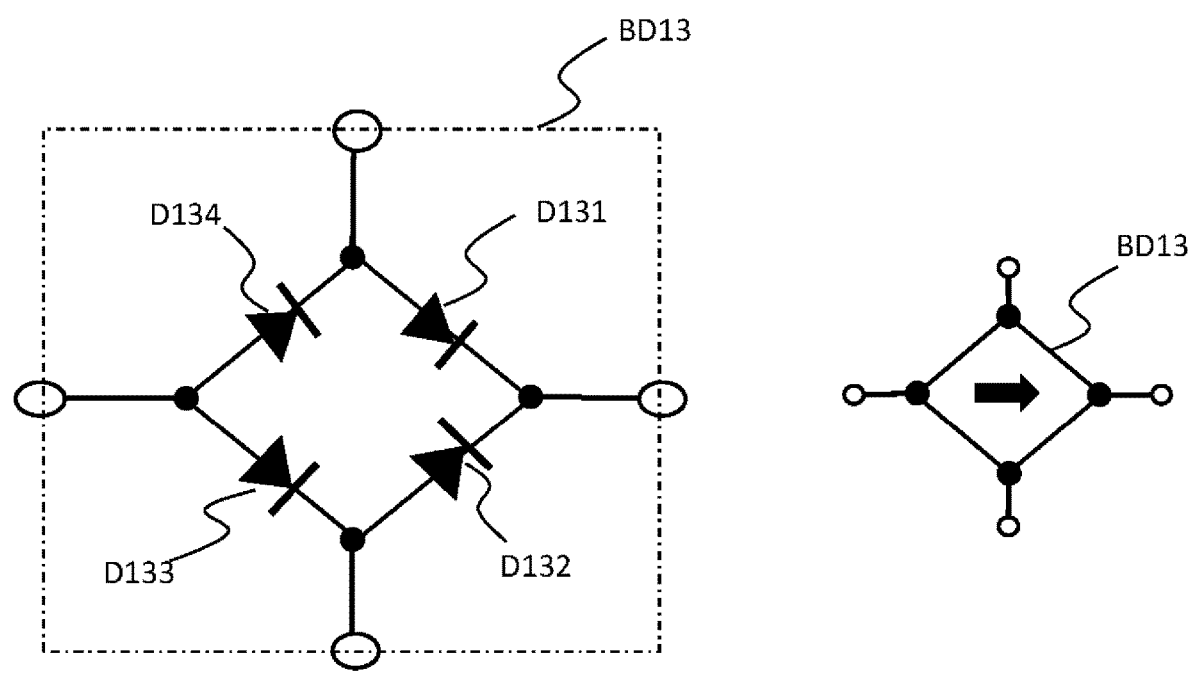
FIG. 13 is a diagram illustrating a structural example of a rectifier BD13.

A current detector Isens11 can have a structure constituted of a resistor Rsens and a comparator CmpSens as illustrated in FIG. 5. BD13 denotes a first rectifier, which can have a bridge configuration constituted of fast recovery diodes D131, D132, D133, and D134 as illustrated in FIG. 13. SW14a and SW14b denote switching elements constituting a switch SW14, and each of them is an N-channel MOSFET. C16 denotes a capacitor that reduces noise and heat generation due to switching. D20a and D20b denote body diodes of the switching elements SW14a and SW14b or parallel diodes of the same.

A first terminal of the input smoothing capacitor C3, a first terminal of the coil L4, and a first input terminal of the first rectifier BD13 are connected to a first terminal of the alternating-current input power AC1. A second terminal of the coil L4, a second input terminal of the first rectifier BD13, and a first terminal of the capacitor C16 are connected to a first terminal of the switching element SW14a. A second terminal of the input smoothing capacitor C3, a second terminal of the capacitor C16, and a first terminal of a current detector Isens26 are connected to a second terminal of the alternating-current input power AC1. A second terminal of the switching element SW14a is connected to a first terminal of the switching element SW14b. A second terminal of the switching element SW14b and a second terminal of the current detector Isens26 are connected to a first terminal of a current limiting element Irest21. A second terminal of the current limiting element Irest21 is connected to the anode of a second rectifier D25. The cathode of the second rectifier D25 is connected to a first output terminal of the first rectifier BD13. The first output terminal of the first rectifier BD13 is connected to a first terminal of the output smoothing capacitor C7 and a first terminal of the output load Load8. A second terminal of the first rectifier BD13 is connected to a first terminal of the current detector Isens11. A second terminal of the current detector Isens11 is connected to a second terminal of the output smoothing capacitor C7 and a second terminal of the output load Load8. Control terminals of the switching elements SW14a and SW14b, signal output terminals of the current detectors Isens11 and Isens26, and an application terminal of the output voltage Vout are connected to a control circuit CTRL91.

In this way, the power supply device 101 includes the switch SW14 (switching elements SW14a and SW14b) and the coil L4 connected in series with the alternating-current input power AC1, and the first rectifier BD13 connected across terminals of the coil L4, which performs the boost rectification, to charge the voltage across terminals of the output smoothing capacitor C7 so that the output power is obtained. Note that a single switching element may constitute the switch SW14.

Figure 14:
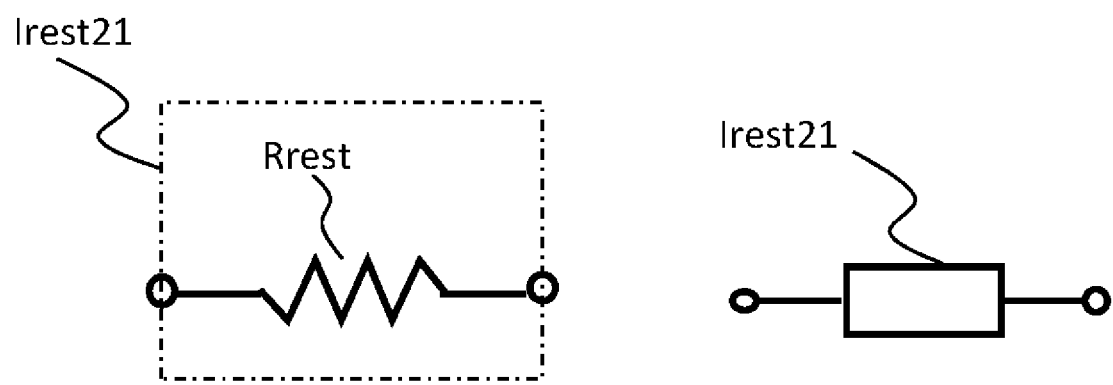
FIG. 14 is a diagram illustrating a structural example of a current limiting element Irest21.
Figure 15:
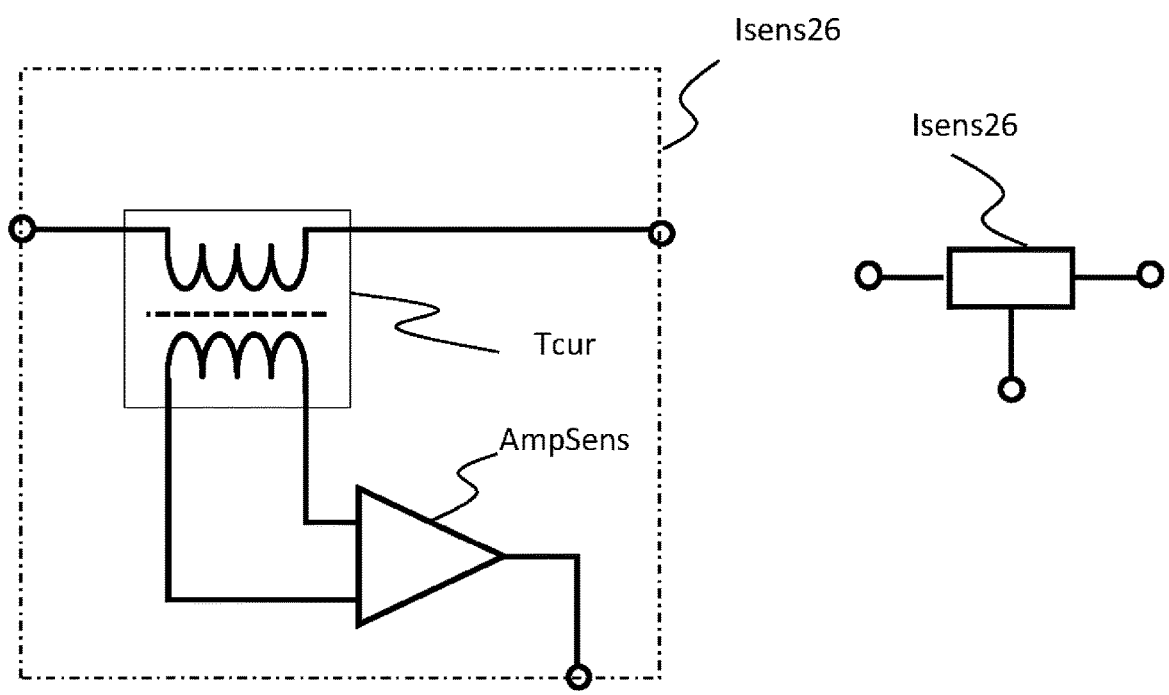
FIG. 15 is a diagram illustrating a structural example of a current detector Isens26.

The current limiting element Irest21 can be constituted of a resistor Rrest as illustrated in FIG. 14. D25 is the second rectifier and is constituted of a single diode. Isens26 is the current detector that detects current flowing in the coil L4 when the switching elements SW14a and SW14b are both turned on, and it can be constituted of a current transformer Tcur and an amplifier AmpSens as illustrated in FIG. 15.

The control circuit CTRL91 controls the power supply device 101 and has a function of controlling the switching elements SW14a and SW14b so that a phase difference between the input current waveform and the input voltage waveform is eliminated (i.e. power factor improvement function). Note that the control circuit CTRL91 can have a structure as illustrated in FIG. 16, for example.

Figure 16:
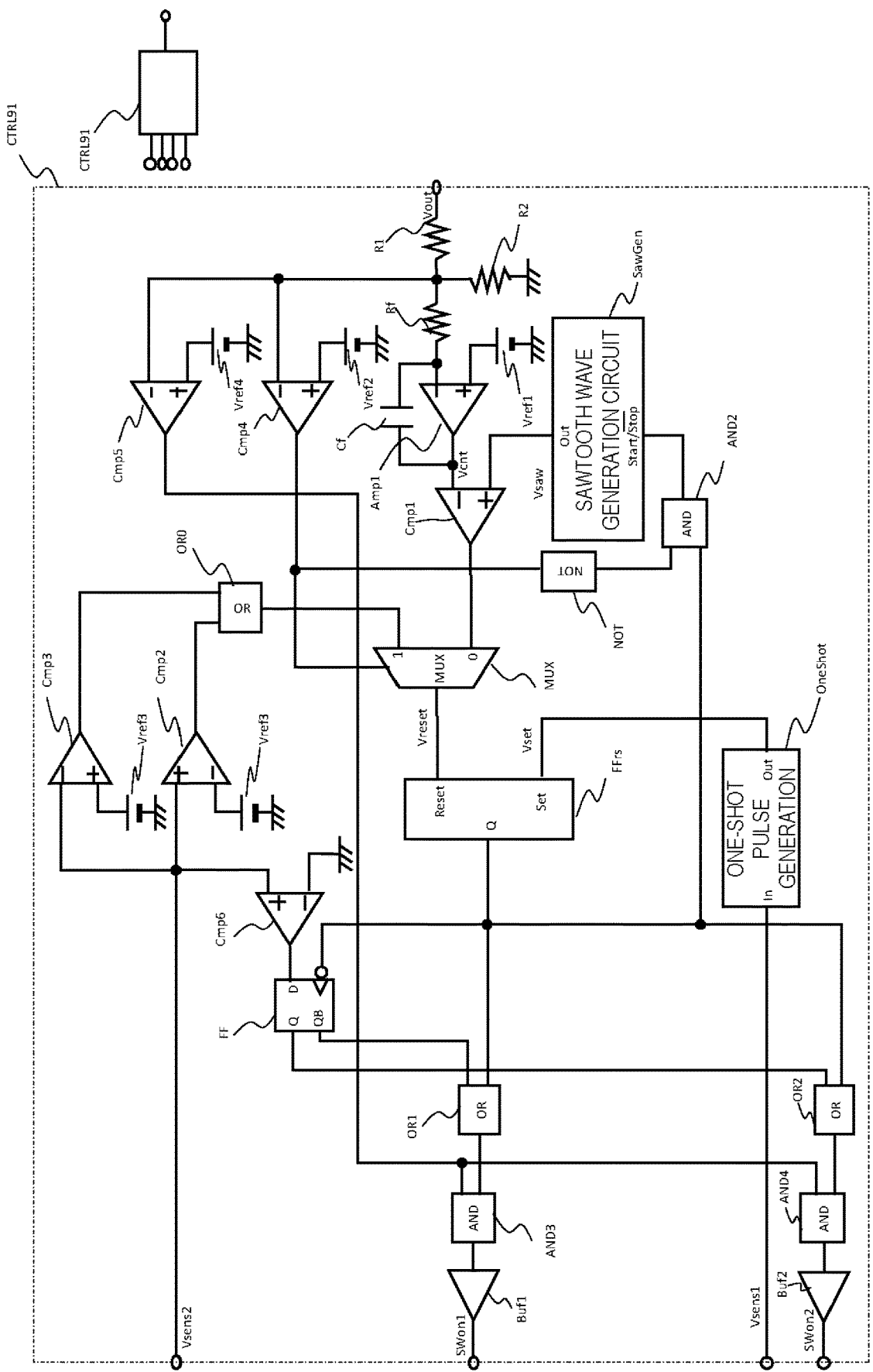
FIG. 16 is a diagram illustrating a structural example of a control circuit CTRL91.

In FIG. 16, an input terminal of the output voltage Vout is connected to an output terminal of the power supply device 101 (i.e. high potential terminal of the output load Load8). R1 and R2 denote resistors. Rf and Cf denote a resistor and a capacitor, respectively. Vref1 denotes a reference voltage for controlling the output voltage Vout of the power supply device 101 to be constant. Amp1 denotes an operational amplifier. Cmp1 denotes a comparator. SawGen denotes a sawtooth wave generation circuit. An input terminal of a current detection pulse Vsens1 is connected to an output of the current detector Isens11. OneShot denotes a one-shot pulse generation circuit that generates a pulse in synchronization with an input edge change, after a predetermined period of time. FFrs denotes an RS flip-flop with a reset/set input. Buf1 denotes a buffer that drives the switching element SW14a. These components are disposed for the control circuit CTRL91 to perform the same operation as the control circuit CTRL9.

Cmp2, Cmp3, Cmp4, Cmp5, and Cmp6 denote comparators. Vref2 denotes a reference voltage for checks the output voltage Vout of the power supply device 101 so as to perform the current suppression switching operation (soft start control). An input terminal of the current detection signal Vsens2 is connected to an output of the current detector Isens26. Vre3 denotes a reference voltage for setting a voltage corresponding to an upper limit value of exciting current of the coil L4 so as to suppress an increase speed of the output voltage Vout by the switching control. Vref4 denotes a reference voltage for determining a voltage value of the output voltage Vout to finish the preliminary charge operation and start the switching operation.

AND2, AND3, and AND4 denote logic circuits each of which outputs a voltage corresponding to AND of two inputs. NOT denotes a logic circuit that outputs a voltage corresponding to inverse logic of an input signal (i.e. output of the comparator Cmp4). Note that the logic circuit AND2 outputs an AND signal of an output of the logic circuit NOT and the Q output of the RS flip-flop FFrs to a Start/Stop input terminal of the sawtooth wave generation circuit SawGen.

OR0, OR1, and OR2 denote logic circuits each of which outputs a voltage corresponding to OR of two inputs. MUX denotes a multiplexer of two inputs. FF denotes a D flip-flop, whose clock terminal is connected to the Q output of the RS flip-flop FFrs. Buf2 denotes a buffer for driving the switching element SW14b.

Figure 17:
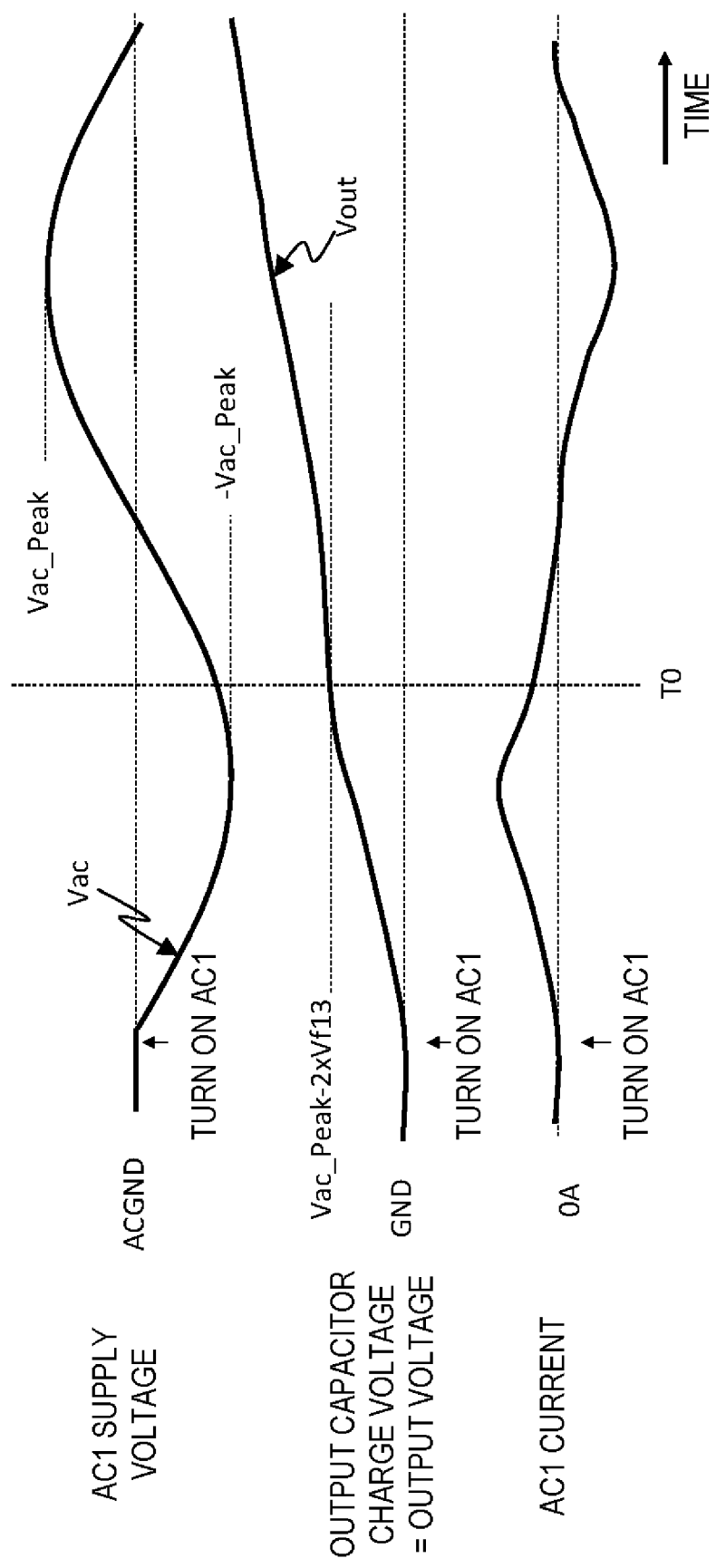
FIG. 17 is a preliminary charge waveform diagram when power is turned on by the power supply device 101.

When the alternating-current input power AC1 is turned on, a charge voltage of the input smoothing capacitor C3 is increased, and current rectified by the second rectifier D25 via the current limiting element Irest21 charges the output smoothing capacitor C7. In this case, the current limiting element Irest21 suppresses rush current, and hence large current does not flow. The current limiting element Irest21 and the second rectifier D25 work as a preliminary charging circuit. After the alternating-current input power AC1 is turned on, unlike the conventional structure, only the path of the preliminary charging circuit (Irest21 and D25) preliminarily charges the output smoothing capacitor C7. Therefore, until start of the boost rectification by the first rectifier BD13 by switching control, rush current is suppressed by the current limiting element Irest21 as illustrated in FIG. 17. Vac_Peak and −Vac_Peak in FIG. 17 denote a positive peak voltage and a negative peak voltage of the AC input voltage Vac, respectively. In addition, Vf13 denotes forward voltages of the fast recovery diodes D131 to D134 constituting the first rectifier BD13. Before time T0 in FIG. 17, the following expression (5) is satisfied, and the preliminary charging circuit (Irest21 and D25) perform the preliminary charge operation.

$$Vout \leq Vac\_Pack - 2 \times Vf13 \quad (5)$$

On the other hand, waveforms after time T0 in FIG. 17 illustrates a manner in which the output smoothing capacitor C7 is charged by the boost rectification by switching.

When a value of the resistor Rrest constituting the current limiting element Irest21 is increased, AC1 current in FIG. 17 (i.e. current supplied from the alternating-current input power AC1) is suppressed to be less so that timing of time T0 can be further delayed. In this way, in the power supply device 101 of the first embodiment, rush current when the alternating-current input power AC1 is turned on can be suppressed.

After the output voltage Vout across terminals of the output smoothing capacitor C7 is increased by the preliminary charging circuit (Irest21 and D25), or during an increase of the output voltage Vout, the timing when normal switching operation is started (i.e. a voltage corresponding to the output voltage Vout at this timing) is set by the reference voltage Vref4. The output voltage Vout is divided by the resistors R1 and R2, and the divided voltage is compared with the reference voltage Vref4. Therefore, as expressed by the following expression (6), the reference voltage Vref4 is appropriately set so that the output voltage Vout is a voltage lower than Vac_Peak−2×Vf13.

$$Vref4 < (Vac\_Pack - 2 \times Vf13) \times \{R1 + R2)\} \quad (6)$$

An output of a comparator Cmp5 that compares the divided voltage of the output voltage Vout with the reference voltage Vref4 is input to the logic circuits AND3 and AND4. Therefore switching control outputs SWon1 and SWon2 of the buffers Buf1 and Buf2 connected to the gates of the switching elements SW14a and SW14b, respectively, are controlled by the logic circuits AND3 and AND4. In other words, the switching elements SW14a and SW14b are maintained to be off until the output voltage Vout by the preliminary charge becomes a voltage set by the reference voltage Vref4. When the output voltage Vout becomes higher than the voltage set by the reference voltage Vref4, the output of the comparator Cmp5 becomes a voltage corresponding to logic level 1. Therefore, as the switching control outputs SWon1 and SWon2, switching waveforms by the control circuit CTRL91 can be output.

The switching control is started, and the control circuit CTRL91 controls the switching elements SW14a and SW14b to switch, so that the output voltage Vout across terminals of the output smoothing capacitor C7 is increased. However, if the same feedback control as the conventional example described above is performed, when the output rating is large, the charging current for the output smoothing capacitor C7 is so large that the output voltage Vout may increase too rapidly. Therefore, a mechanism for softening the increase of the output voltage Vout may be provided.

In the example of this diagram, during the period until the output voltage Vout increases to a voltage corresponding to the reference voltage Vref2, the comparator Cmp4 outputs a voltage corresponding to logic level 1, and the multiplexer MUX selects the output of the logic circuit OR0. If the exciting current flowing in the coil L4 is positive, when the current detection signal Vsens2 output from the current detector Isens26 reaches the voltage set by the reference voltage Vref3 after switch-on by the zero-voltage switching, the comparator Cmp2 outputs a voltage corresponding to the logic level 1. As a result, the reset signal Vreset of the RS flip-flop FFrs becomes logic level 1 via the logic circuit OR0 and the multiplexer MUX so that the switch-on is canceled. On the contrary, if the exciting current flowing in the coil L4 is negative, when the current detection signal Vsens2 output from the current detector Isens26 reaches a voltage set by the reference voltage −Vref3 after switch-on by the zero-voltage switching, the comparator Cmp3 outputs a voltage corresponding to logic level 1. As a result, the reset signal Vreset of the RS flip-flop FFrs becomes logic level 1 via the logic circuit OR0 and the multiplexer MUX, and hence switch-on is canceled also. This is equivalent to controlling the exciting current of the coil L4 to be equal to or less than the upper limit value corresponding to ±Vref3. Therefore, the voltage increase speed of the output voltage Vout can be controlled by controlling the charging current for the output smoothing capacitor C7. In other words, the soft start control of the output voltage Vout can be performed.

Figure 18:
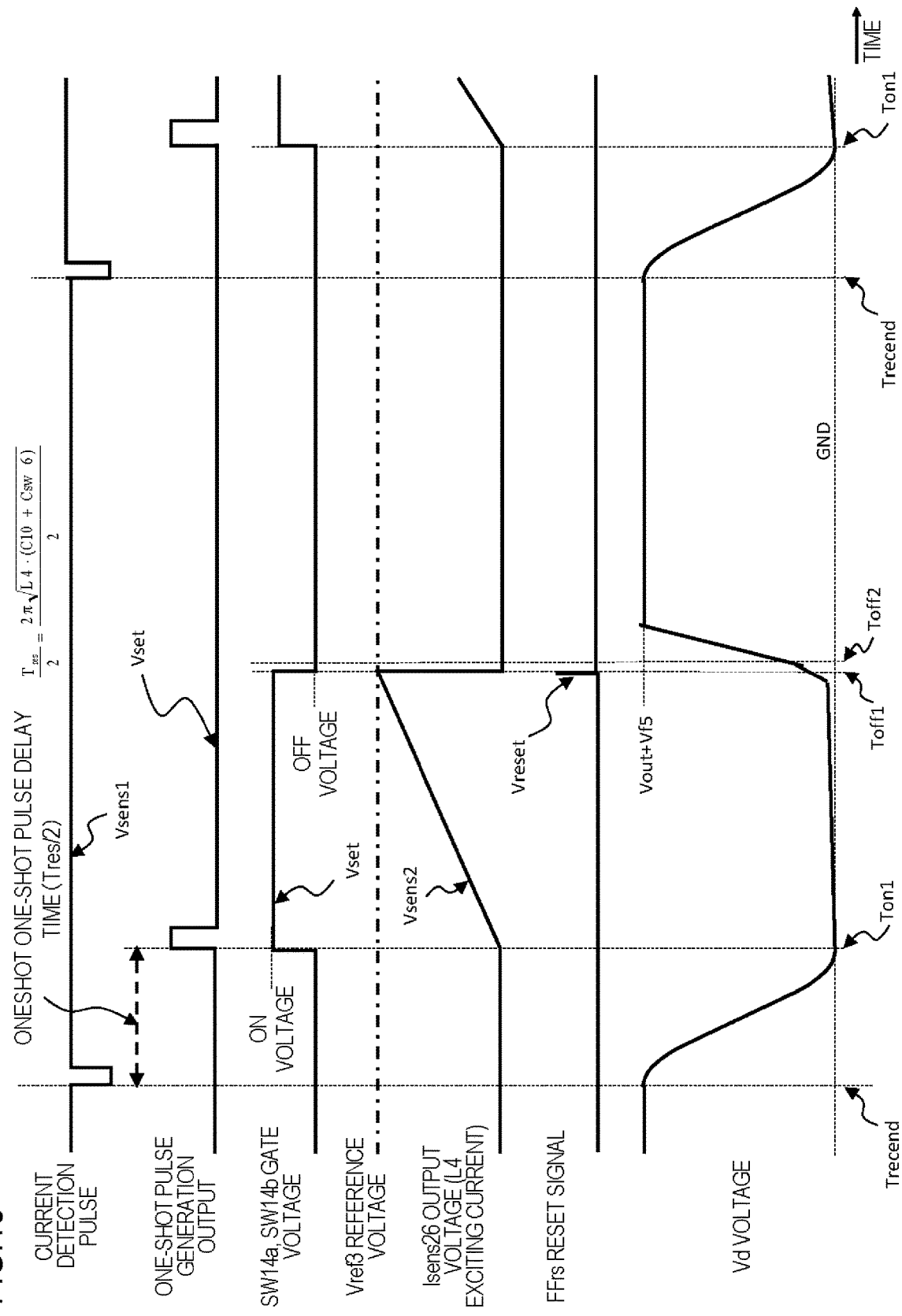
FIG. 18 is a timing waveform diagram of current suppression switching by the power supply device 101.

Even if the rush current is reduced by the preliminary charging circuit (Irest21 and D25), when the output voltage Vout continues to increase to a rated set voltage by switching, the output load Load8 may not be connected yet. In this case, if power is supplied to the output load Load8 in the normal switching operation, current to the output smoothing capacitor C7 is so large that the output voltage Vout may largely exceed the set voltage. In order to avoid this, the current suppression switching operation (soft start control) is effective. FIG. 18 illustrates timing waveforms of the current suppression switching operation (soft start control).

Figure 19:
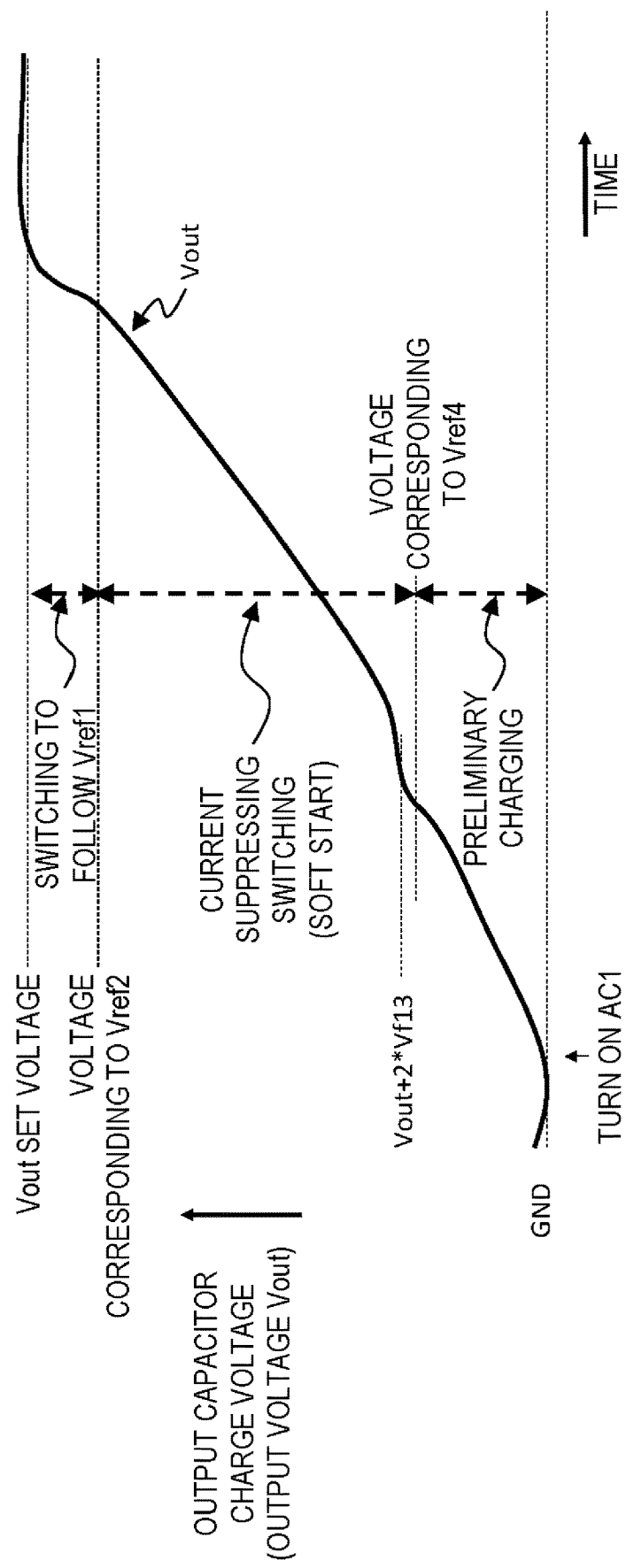
FIG. 19 is an output voltage waveform diagram after power is turned on by the power supply device 101.

The current suppression switching operation (soft start control) described above is continued until the output voltage Vout becomes a voltage set by the reference voltage Vref2. Note that the reference voltage Vref2 is preferably set to a voltage lower than the voltage corresponding to a rated output voltage of the output voltage Vout. When the output voltage Vout exceeds the voltage set by the reference voltage Vref2, the output of the comparator Cmp4 becomes logic level 0. Therefore, the multiplexer MUX selects the output path of the comparator Cmp1 that compares the control voltage Vcnt output from the operational amplifier Amp1 with the sawtooth wave voltage Vsaw, and hence the output voltage Vout is controlled to be the rated output voltage. In this way, the reference voltages Vref2 and Vref4 are compared with the output voltage Vout, and three operation modes (preliminary charge operation, current suppression switching operation, and switching operation to follow the reference voltage Vref1) are switched so that the output voltage Vout increases. This manner is illustrated in FIG. 19 as a schematic diagram.

When the output voltage Vout across terminals of the output smoothing capacitor C7 reaches the set voltage, the control circuit CTRL91 performs switching control so as to maintain the set voltage while consuming the load current to the output load Load8. In this case, the control circuit CTRL91 controls a switching mode to be an intermittent mode, so that exciting current of the coil L4 stored during switch-on time is output entirely to the output smoothing capacitor C7 via the first rectifier BD13 during switch-off time in every switching period.

A loss due to the first rectifier BD13 in this case is described below. As described above, the first rectifier BD13 performs boost rectification of the exciting current of the coil L4 with respect to the terminals of the coil L4 so that the output voltage Vout is controlled to a steady state. In the conventional example (FIG. 1) described above, losses of the rectifying diode D5 (Vf5=1 V) and the rectifier BD2 (Vf2=1 V) are 1 W and 3.34 W, respectively, when the output rating is 400 V/400 W under the condition that the alternating-current input power AC1 is 240 V. In addition, they are 1 W and 8 W, respectively, under the condition that the alternating-current input power AC1 is 100 V.

On the other hand, in the structure of FIG. 12, when the forward voltage Vf13 of each of the fast recovery diodes D131 to D134 in the first rectifier BD13 is 1 V, because the boost rectification current is 400 W/400 V=1 A, a loss in the first rectifier BD13 is 1 A×1 V×2=2 W. This loss is apparently smaller than that in the conventional structure. In addition, the loss is the same in a range of 100 V to 240 V as the rated voltage of the alternating-current input power AC1, and there is no change in the loss due to the rated voltage of the alternating-current input power AC1. In this way, adopting this embodiment, the loss of the first rectifier BD13 at the rated voltage of the alternating-current input power AC1 does not change, and the loss can be smaller than that in the conventional example.

Next, with respect to FIGS. 20 and 21, as described below, the switching control of this embodiment can perform the zero-voltage switching as long as the output voltage Vout is 400 V even if the rated value of the AC input voltage Vac is 240 V.

Figure 20:
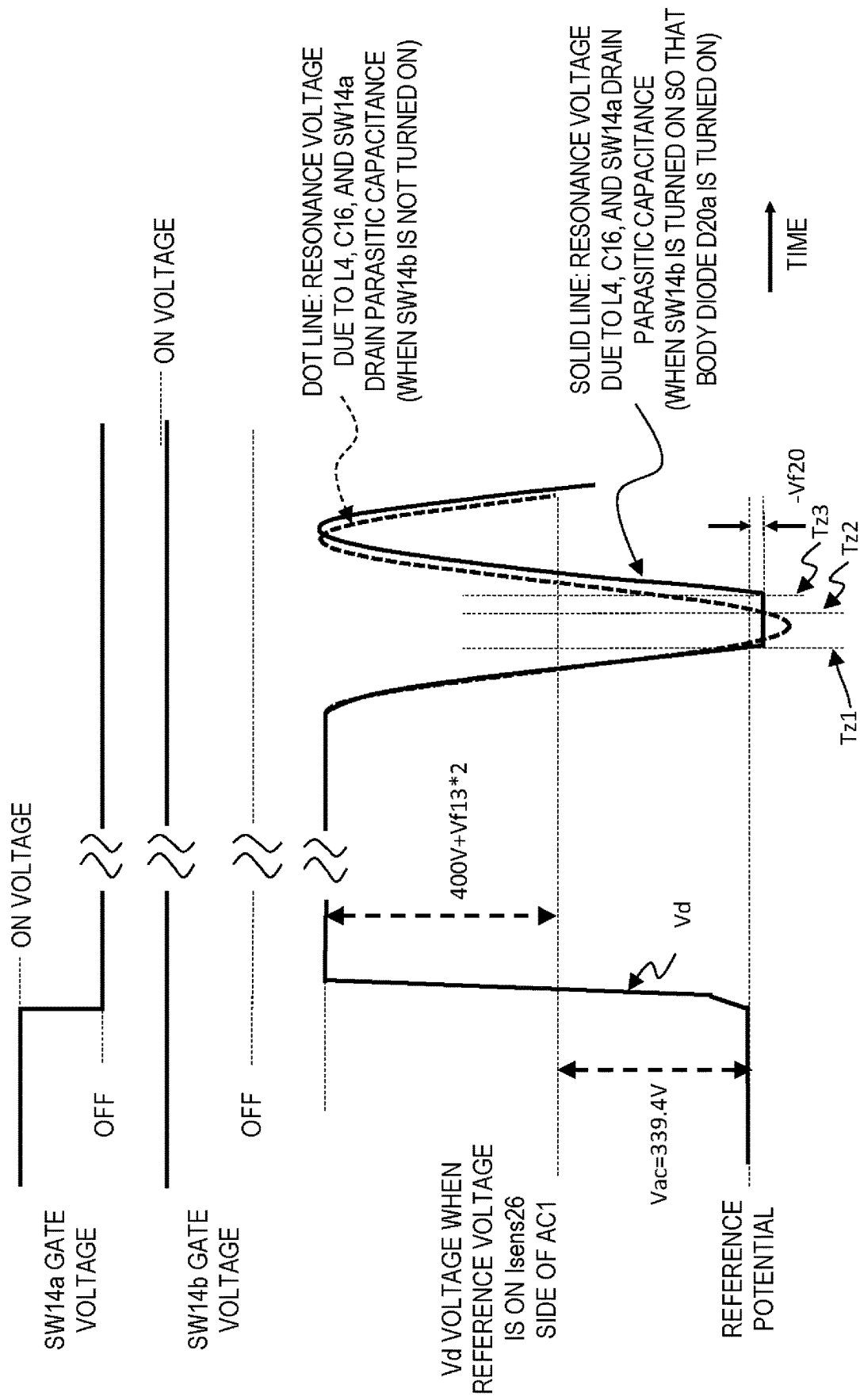
FIG. 20 is a waveform diagram illustrating zero-voltage switching by the power supply device 101 (Vac>0).

FIG. 20 illustrates waveforms of the voltage Vd across terminals of the SW14 (i.e. voltage across terminals of the switch SW14 constituted of the switching elements SW14a and SW14b) when the AC input voltage Vac is positive voltage (240 V×√2=339.4 V). Note that the reference potential in the diagram is a potential connected to the current detector Isens26, out of terminal potentials of the alternating-current input power AC1. This voltage may be a ground voltage ACGND, or may be a negative or positive potential with respect to the ground voltage ACGND.

The switching control of this embodiment is performed by operation in which the control circuit CTRL91 constituted as illustrated in FIG. 16 outputs the switching control outputs SWon1 and SWon2 for driving the switching elements SW14a and SW14b of the power supply device 101.

In this case, the current detection signal Vsens2 output from the current detector Isens26 of the power supply device 101 is compared with the zero-voltage by the comparator Cmp6, whose output is supplied to a data terminal D of a D flip-flop FF for timing control. The D flip-flop FF operates with a clock input that is Q output of the RS flip-flop FFrs, and Q output of the D flip-flop FF is supplied to the logic circuit OR2 while QB output of the same is supplied to the logic circuit OR1.

The logic circuit OR1 generates a logical OR signal between the Q output of the RS flip-flop FFrs and the QB output of the D flip-flop FF so as to supply the logical OR signal to the logic circuit AND3. On the other hand, the logic circuit OR2 generates a logical OR signal between the Q output of the RS flip-flop FFrs and the Q output of the D flip-flop FF so as to supply the logical OR signal to the logic circuit AND4.

Therefore, if the AC input voltage Vac is a positive voltage and the Q output of the D flip-flop FF is logic level 1, the switching control output SWon2 for the switching element SW14b is forcibly set to on-potential. As a result, the switching element SW14b is always turned on, and the switching element SW14a performs switching operation.

At the same instant when the switching element SW14a is turned off, the voltage Vd across terminals of the switch SW14 is raised to Vac=339.4 V. After that, when it is further raised from 339.4 V by the rectified voltage 400 V+Vf13×2 due to the excitation energy of the coil L4, the boost rectification by the first rectifier BD13 is started. Note that Vf13 is the forward voltage of each of the fast recovery diodes D131 to D134 constituting the first rectifier BD13.

Next, when the exciting current by the coil L4 finishes flowing, the voltage Vd across terminals of the switch SW14 oscillates with the coil L4, the noise-switching heat generation suppressing capacitor C16, and the drain parasitic capacitance of the switching element SW14a. The center voltage of this resonance is Vac=339.4 V, and the amplitude thereof is 400 V+Vf13×2. Therefore, the voltage Vd across terminals of the switch SW14 always reaches the reference potential of the alternating-current input power AC1. The dot line in FIG. 20 shows its operation.

In this case, because the switching element SW14b on the low potential side is turned on, the voltage Vd across terminals of the switch SW14 is clamped at a negative potential from the reference potential by a forward voltage Vf20 of the body diode D20a of the switching element SW14a. The one-shot pulse generation circuit OneShot illustrated in FIG. 16 adjusts time so that the switching element SW14a is turned on again in a period from time Tz1 to time Tz3, and thus the zero-voltage switching can be performed. With the zero-voltage switching, a loss due to the switching element SW14a is eliminated. It is apparent that when the AC input voltage Vac is lower than 339.4 V, the zero-voltage switching can be always performed.

Figure 21:
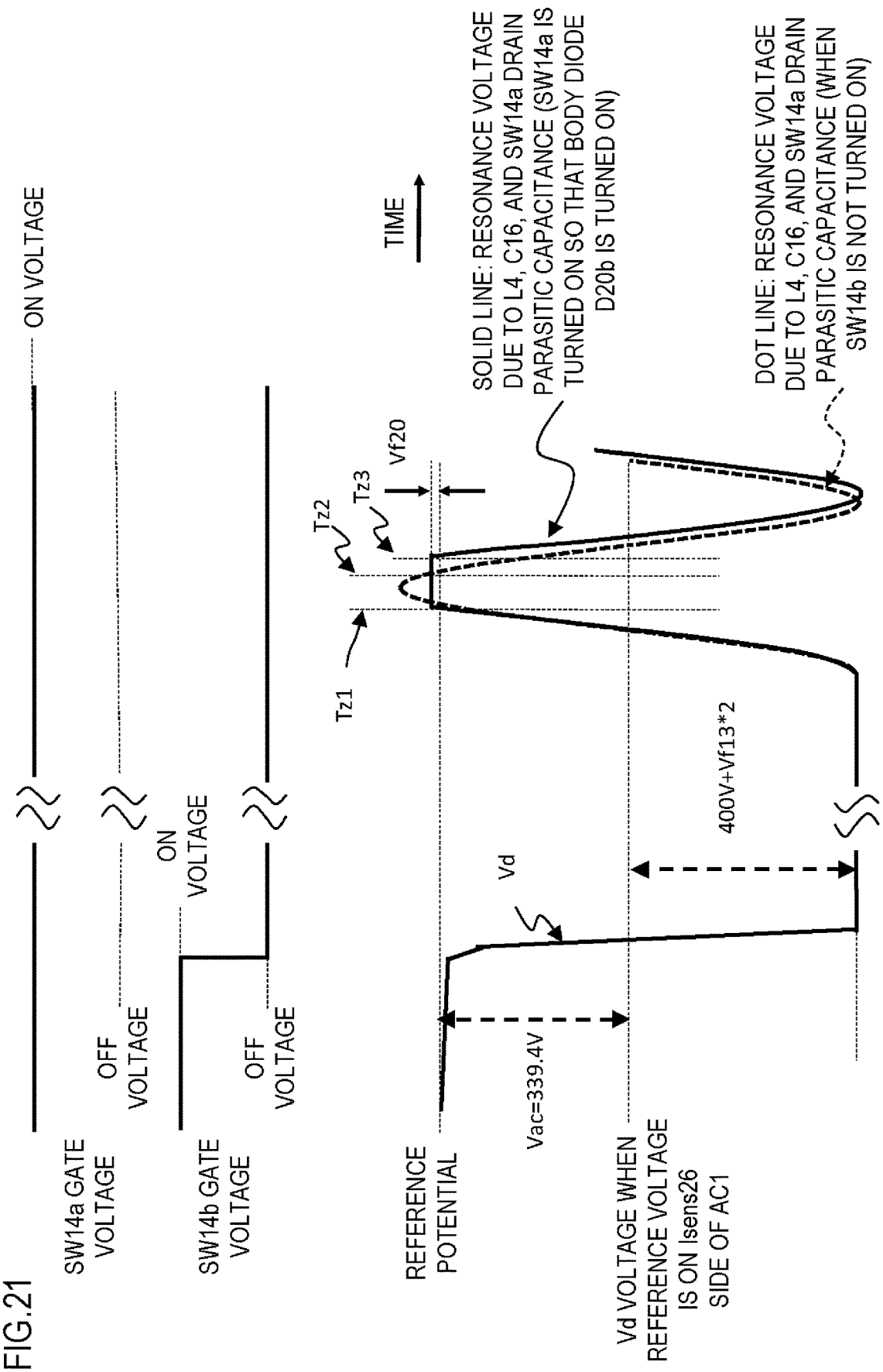
FIG. 21 is a waveform diagram illustrating the zero-voltage switching by the power supply device 101 (Vac<0).

FIG. 21 shows the waveform of the voltage Vd across terminals of the switch SW14 when the AC input voltage Vac is a negative voltage (−240 V×√2=−339.4 V). Note that the reference potential in the diagram is a potential connected to the current detector Isens26, out of potentials of the alternating-current input power AC1, similarly to FIG. 20. This voltage may be the ground voltage ACGND, or may be a negative or positive potential with respect to the ground voltage ACGND.

As described above, the switching control of this embodiment is performed by operation in which the control circuit CTRL91 constituted as illustrated in FIG. 16 outputs the switching control outputs SWon1 and SWon2 for driving the switching elements SW14a and SW14b of the power supply device 101.

In this case, the current detection signal Vsens2 output from the current detector Isens26 of the power supply device 101 is compared with the zero-voltage by the comparator Cmp6, whose output is supplied to the data terminal D of the D flip-flop FF for timing control. The D flip-flop FF operates with a clock input that is the Q output of the RS flip-flop FFrs, and the Q output of the D flip-flop FF is supplied to the logic circuit OR2 while the QB output of the same is supplied to the logic circuit OR1.

The logic circuit OR1 generates a logical OR signal between the Q output of the RS flip-flop FFrs and the QB output of the D flip-flop FF so as to supply the logical OR signal to the logic circuit AND3. On the other hand, the logic circuit OR2 generates a logical OR signal between the Q output of the RS flip-flop FFrs and the Q output of the D flip-flop FF so as to supply the logical OR signal to the logic circuit AND4. These operations are also the same as described above.

Therefore, if the AC input voltage Vac is a negative voltage and the QB output of the D flip-flop FF is logic level 1, the switching control output SWon1 for the switching element SW14a is forcibly set to on-potential. As a result, the switching element SW14a is always turned on, and the switching element SW14b performs switching operation.

At the same instant when the switching element SW14b is turned off, the voltage Vd across terminals of the switch SW14 is dropped to Vac=−339.4 V. After that, when it is further dropped from −339.4 V by the rectified voltage 400 V+Vf13×2 due to the excitation energy of the coil L4, the boost rectification by the first rectifier BD13 is started. Note that Vf13 is the forward voltage of each of the fast recovery diodes D131 to D134 constituting the first rectifier BD13.

Next, when the exciting current by the coil L4 finishes flowing, the voltage Vd across terminals of the switch SW14 oscillates with the coil L4, the noise-switching heat generation suppressing capacitor C16, and the drain parasitic capacitance of the switching element SW14a. The center voltage of this resonance is Vac=−339.4 V, and the amplitude thereof is 400 V+Vf13×2. Therefore, the voltage Vd across terminals of the switch SW14 always reaches the reference potential of the alternating-current input power AC1. The dot line in FIG. 21 shows its operation.

In this case, because the switching element SW14a on the low potential side is turned on, the voltage Vd across terminals of the switch SW14 is clamped at a positive potential from the reference potential by the forward voltage Vf20 of the body diode D20b of the switching element SW14b. The one-shot pulse generation circuit OneShot illustrated in FIG. 16 adjusts time so that the switching element SW14b is turned on again in a period from time Tz1 to time Tz3, and thus the zero-voltage switching can be performed. With the zero-voltage switching, a loss due to the switching element SW14b is eliminated. It is apparent that when the AC input voltage Vac is higher than −339.4 V, the zero-voltage switching can be always performed.

As described above, even if the input voltage Vac of the alternating-current input power AC1 is set to any voltage within a wide range, the power supply device 101 of this embodiment can perform the zero-voltage switching, and losses due to the switching elements SW14a and SW14b can be eliminated.

Second Embodiment

Figure 22:
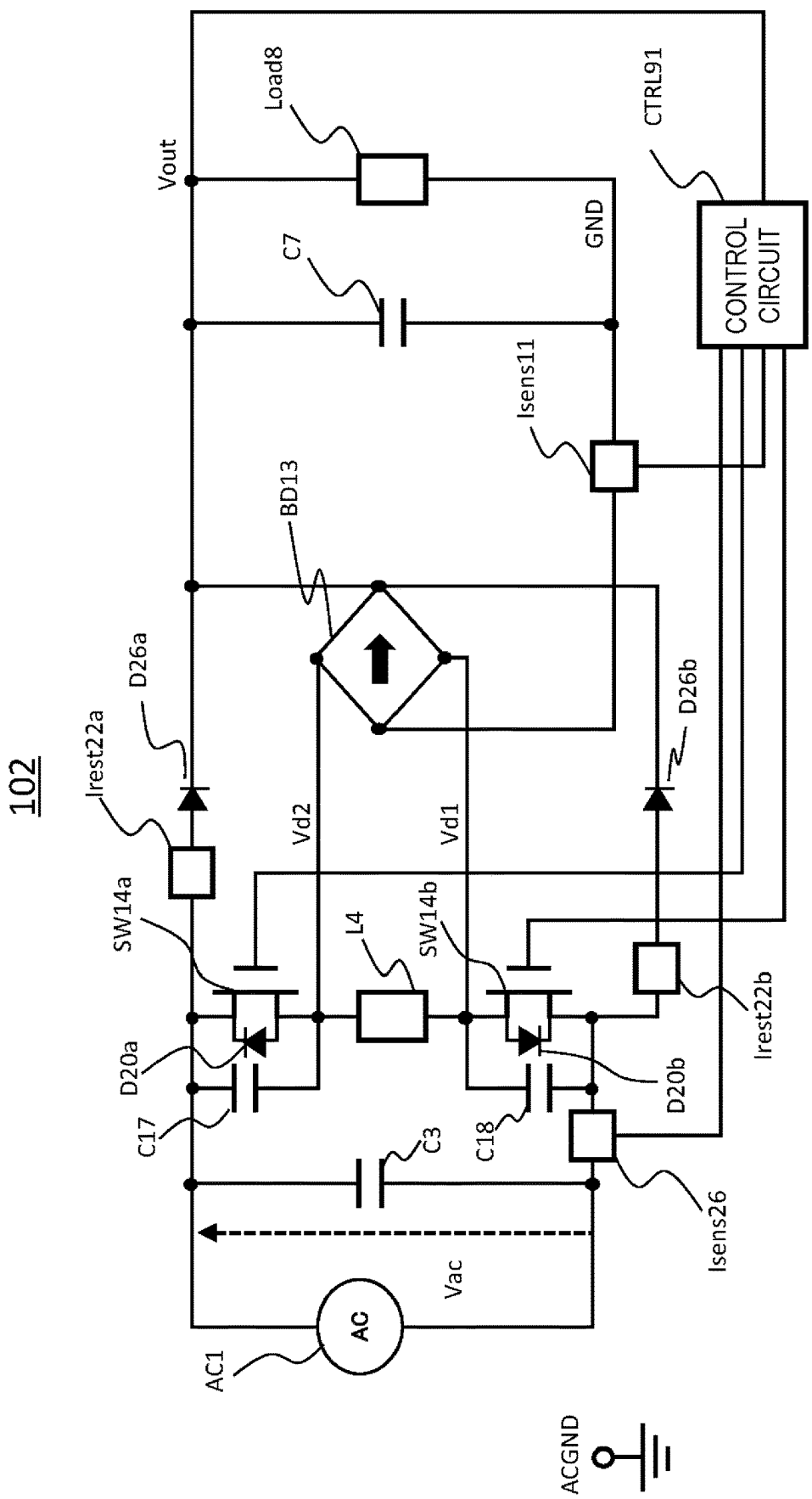
FIG. 22 is a diagram illustrating a power supply device 102 of a second embodiment.

FIG. 22 is a diagram illustrating a power supply device 102 according to a second embodiment of the present invention. C17 and C18 denote capacitors that reduce noise and heat generation due to switching. Irest22a and Irest22b denote current limiting elements. D26a and D26b are second rectifiers, each of which is constituted of a diode. A difference from the first embodiment is that the coil L4 is connected to a different position, while it is the same that the switching elements SW14a and SW14b and the coil L4 are connected in series with the alternating-current input power AC1.

The first terminal of the input smoothing capacitor C3, a first terminal of the capacitor C17, the first terminal of the switching element SW14a, and a first terminal of the current limiting element Irest22a are connected to the first terminal of the alternating-current input power AC1. A second terminal of the capacitor C17, the second terminal of the switching element SW14a, and the first terminal of the coil L4 are connected to a first input terminal of the first rectifier BD13. A first terminal of the capacitor C18, the first terminal of the switching element SW14b, and a second terminal of the coil L4 are connected to the second input terminal of the first rectifier BD13. The second terminal of the input smoothing capacitor C3 and the first terminal of the current detector Isens26 are connected to the second terminal of the alternating-current input power AC1. A second terminal of the capacitor C18, the second terminal of the switching element SW14b, and the second terminal of the current detector Isens26 are connected to a first terminal of the current limiting element Irest22b. A second terminal of the current limiting element Irest22a is connected to the anode of the second rectifier D26a. A second terminal of the current limiting element Irest22b is connected to the anode of the second rectifier D26b. The cathodes of the second rectifiers D26a and D26b are connected to the first output terminal of the first rectifier BD13. The first output terminal of the first rectifier BD13 is connected to the first terminal of the output smoothing capacitor C7 and the first terminal of the output load Load8. The second terminal of the first rectifier BD13 is connected to the first terminal of the current detector Isens11. The second terminal of the current detector Isens11 is connected to the second terminal of the output smoothing capacitor C7 and the second terminal of the output load Load8. The control terminals of the switching elements SW14a and SW14b, the signal output terminals of the current detectors Isens11 and Isens26, and an application terminal of the output voltage Vout are connected to the control circuit CTRL91.

When the alternating-current input power AC1 is turned on, the charge voltage of the input smoothing capacitor C3 is increased, and current rectified by the second rectifiers D26a and D26b via the current limiting elements Irest22a and Irest22b charges the output smoothing capacitor C7. In this case, the current limiting elements Irest22a and Irest22b suppress rush current, and hence large current does not flow. The current limiting elements Irest22a and Irest22b and the second rectifiers D26a and D26b work as the preliminary charging circuit. The effect of suppressing the rush current is the same as described above in the first embodiment, and the same effect can be obtained in the second embodiment too.

When the output voltage Vout across terminals of the output smoothing capacitor C7 is raised by the preliminary charging circuit (Irest22a, D24a, Irest22b, and D24b), the control circuit CTRL91 starts switching operation. The switching operation of the control circuit CTRL91 is appropriately set by comparing the divided voltage of the output voltage Vout with the reference voltage Vref4. In other words, in the same manner as description in the first embodiment, the control circuit CTRL91 compares the reference voltages Vref2 and Vref4 with the output voltage Vout, and the three operation modes (the preliminary charge operation, the current suppression switching operation, and the switching operation to follow the reference voltage Vref1) are switched while the rush current suppression and the increase speed control of the output voltage Vout can be performed.

When the output voltage Vout across terminals of the output smoothing capacitor C7 reaches the set voltage, the control circuit CTRL91 performs switching control so as to maintain the set voltage while consuming the load current to the output load Load8.

If the AC input voltage Vac is a positive voltage, the control circuit CTRL91 controls the switching element SW14b to be normally turned on, and the switching element SW14a is switching-controlled. In this way, the output smoothing capacitor C7 is charged, and the output voltage Vout is controlled to be the set voltage corresponding to the reference voltage Vref1.

In addition, if the AC input voltage Vac is a negative voltage, the control circuit CTRL91 controls the switching element SW14a to be normally turned on, and the switching element SW14b is switching-controlled. In this way, the output smoothing capacitor C7 is charged, and the output voltage Vout is controlled to be the set voltage corresponding to the reference voltage Vref1.

Note that in the second embodiment, similarly to the description in the first embodiment, the boosted voltage across terminals of the coil L4 (=Vd1−Vd2) is rectified by the first rectifier BD13. Therefore, compared with the conventional structure in which the AC input voltage Vac is rectified by the rectifier BD2 (FIG. 1), current flowing in the first rectifier BD13 can be reduced, and hence a loss due to the first rectifier BD13 can be suppressed.

In addition, in the control circuit CTRL91, losses of the switching elements SW14a and SW14b can be optimized by turning on the switching elements SW14a and SW14b when the voltage across terminals of each of the switching elements SW14a and SW14b is zero. Note that similarly to the description in the first embodiment, the voltage across terminals of the coil L4 is boosted and rectified by the first rectifier BD13 so as to charge the output smoothing capacitor C7 in this method. Therefore, even if the rated voltage of the alternating-current input power AC1 is set to any voltage within a wide range, zero-voltage switching can be performed, and heat generation due to switching of the switching elements SW14a and SW14b can be largely suppressed.

Third Embodiment

Figure 23:
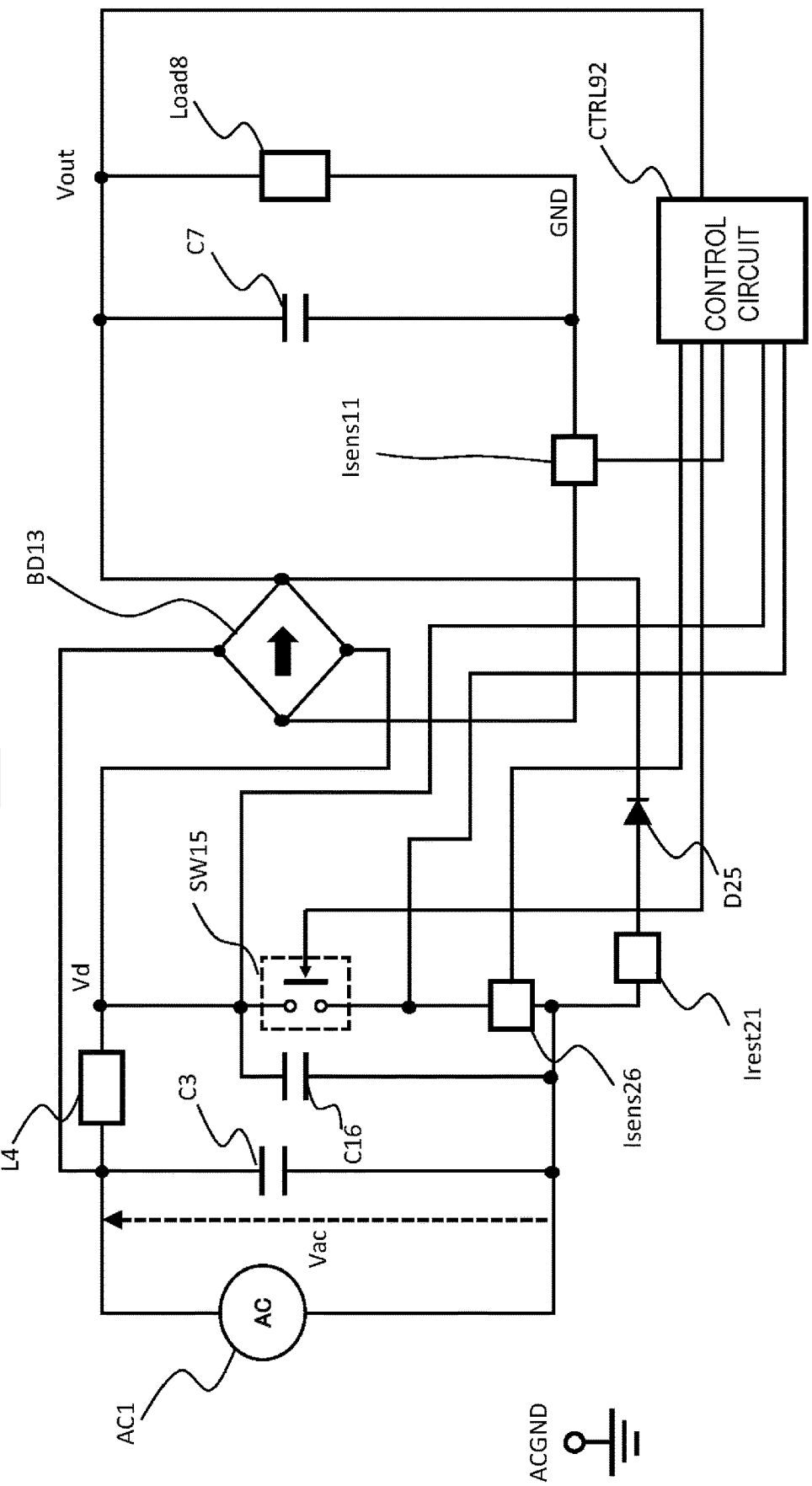
FIG. 23 is a diagram illustrating a power supply device 103 of a third embodiment.
Figure 24:
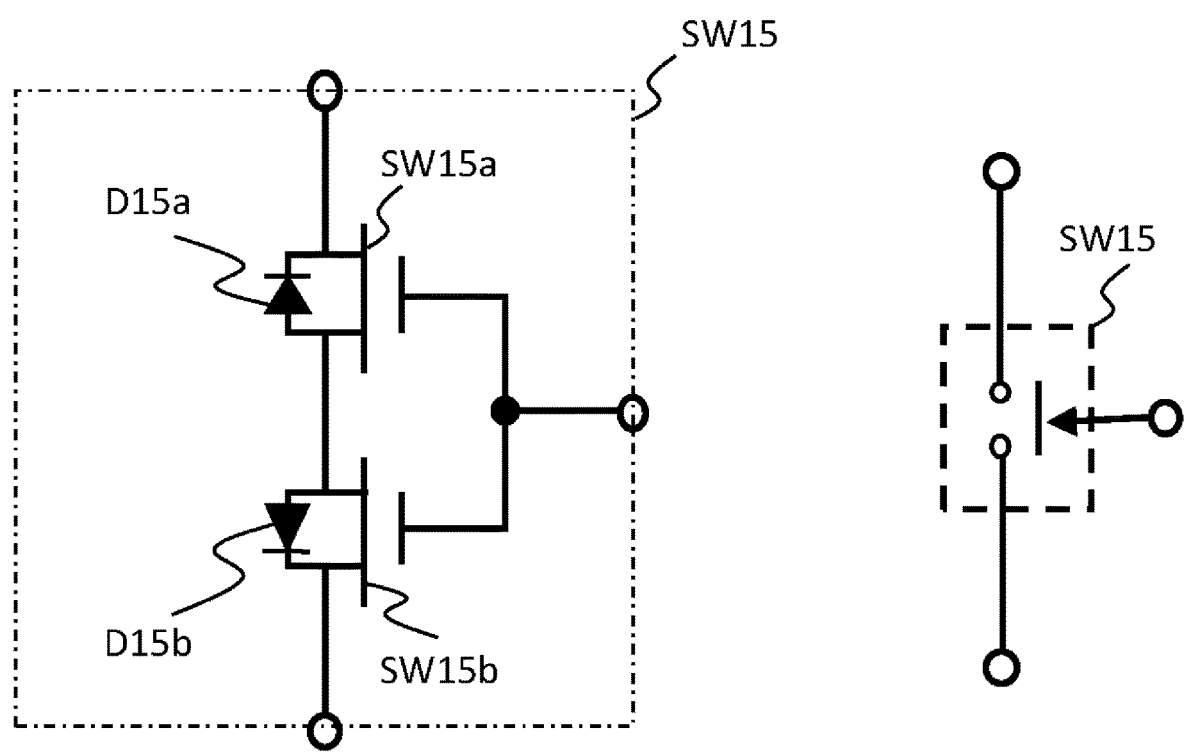
FIG. 24 is a diagram illustrating a structural example of a bidirectional switch SW15.

FIG. 23 is a diagram illustrating a power supply device 103 according to a third embodiment of the present invention. SW15 denotes a bidirectional switch, which can have an example structure illustrated in FIG. 24. SW15a and SW15b denote N-channel MOSFETs, and D15a and D15b denote body diodes or diodes each of which is parallel with each MOSFET. CTRL92 denotes a control circuit, which can be constituted as illustrated in FIG. 25.

Figure 25:
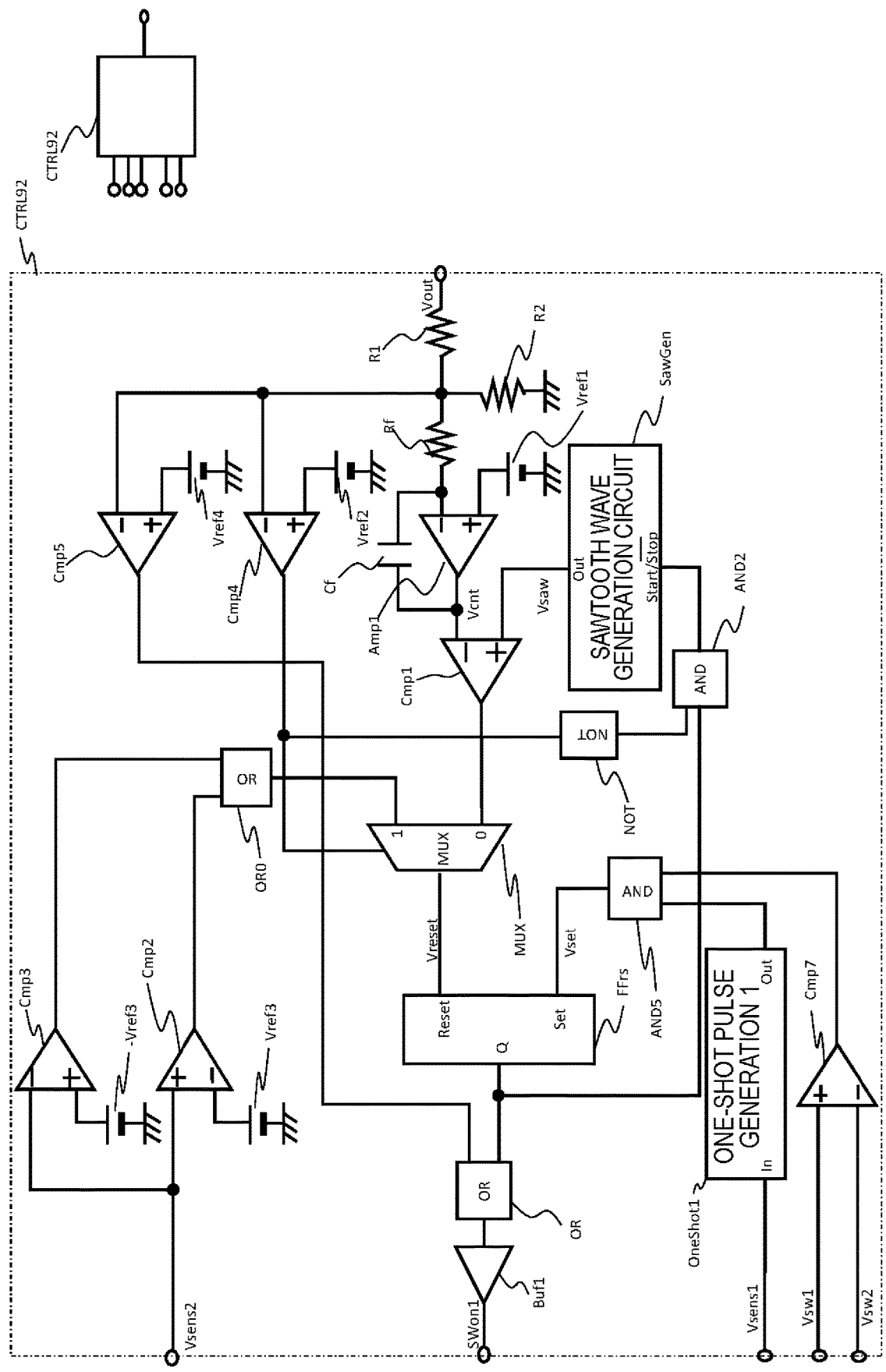
FIG. 25 is a diagram illustrating a structural example of a control circuit CTRL92.

In FIG. 25, OneShot1 denotes a one-shot pulse generation circuit, which outputs a pulse at timing different from the one-shot pulse generation circuit One Shot in the control circuit CTRL91. Cmp7 denotes a comparator that compares terminal voltages Vsw1 and Vsw2 appearing at terminals of the bidirectional switch SW15 in the power supply device 103. AND5 denotes a logic circuit that outputs a voltage corresponding to an AND signal between two inputs.

The first terminal of the input smoothing capacitor C3, the first terminal of the coil L4, and the first input terminal of the first rectifier BD13 are connected to the first terminal of the alternating-current input power AC1. The second terminal of the coil L4, the first terminal of the capacitor C16, and a first terminal of the bidirectional switch SW15 are connected to the second input terminal of the first rectifier BD13. A second terminal of the bidirectional switch SW15 is connected to the first terminal of the current detector Isens26. The second terminal of the input smoothing capacitor C3, the second terminal of the capacitor C16, the second terminal of the current detector Isens26, and the first terminal of the current limiting element Irest21 are connected to the second terminal of the alternating-current input power AC1. The second terminal of the current limiting element Irest21 is connected to the anode of the second rectifier D25. The cathode of the second rectifier D25 is connected to the first output terminal of the first rectifier BD13. The first output terminal of the first rectifier BD13 is connected to the first terminal of the output smoothing capacitor C7 and the first terminal of the output load Load8. The second terminal of the first rectifier BD13 is connected to the first terminal of the current detector Isens11. The second terminal of the current detector Isens11 is connected to the second terminal of the output smoothing capacitor C7 and a second terminal of the output load Load8. The control terminal and both terminals of the bidirectional switch SW15, the signal output terminals of the current detectors Isens11 and Isens26, and the application terminal of the output voltage Vout are connected to the control circuit CTRL92.

When the alternating-current input power AC1 is turned on, the charge voltage of the input smoothing capacitor C3 is increased, and current rectified by the second rectifier D25 via the current limiting element Irest21 charges the output smoothing capacitor C7. In this case, the current limiting element Irest21 suppresses rush current, and hence large current does not flow. The current limiting element Irest21 and the second rectifier D25 work as the preliminary charging circuit. The effect of suppressing the rush current is the same as described above in the first embodiment, and the same effect can be obtained in the third embodiment, too.

When the output voltage Vout across terminals of the output smoothing capacitor C7 is raised by the preliminary charging circuit (Irest21 and D25), the control circuit CTRL92 starts switching operation. The switching operation of the control circuit CTRL92 is appropriately set by comparing the divided voltage of the output voltage Vout with the reference voltage Vref4. In other words, in the same manner as description in the first embodiment, the control circuit CTRL92 compares the reference voltages Vref2 and Vref4 with the output voltage Vout, and the three operation modes (the preliminary charge operation, the current suppression switching operation, and the switching operation to follow the reference voltage Vref1) are switched while the rush current suppression and the increase speed control of the output voltage Vout can be performed.

When the output voltage Vout across terminals of the output smoothing capacitor C7 reaches the set voltage, the control circuit CTRL92 performs switching control so as to maintain the set voltage while consuming the load current to the output load Load8. In this case, in the third embodiment, in the same manner as the description in the first embodiment, the boosted voltage across terminals of the coil L4 is rectified by the first rectifier BD13. Therefore, compared with the conventional structure in which the AC input voltage Vac is rectified by the rectifier BD2 (FIG. 1), current flowing in the first rectifier BD13 can be reduced, and hence a loss due to the first rectifier BD13 can be suppressed.

In addition, in the control circuit CTRL92, losses of the bidirectional switch SW15 can be optimized by turning on the bidirectional switch SW15 when the voltage across terminals of bidirectional switch SW15 is zero.

Note that the bidirectional switch SW15 is switching-controlled only by the switching control output SWon1 supplied from the control circuit CTRL92, and hence the timing of the zero-voltage switching is different from that in the power supply device 101 of the first embodiment. In other words, it is because the voltage Vd across terminals of the switch SW15 (i.e. voltage across terminals of the bidirectional switch SW15) performs resonance operation shown by dot lines in FIGS. 20 and 21 when the bidirectional switch SW15 has the structure of FIG. 24. Therefore, it is necessary to perform zero-voltage switch-on at timing of time Tz2 in FIGS. 20 and 21.

Figure 26:
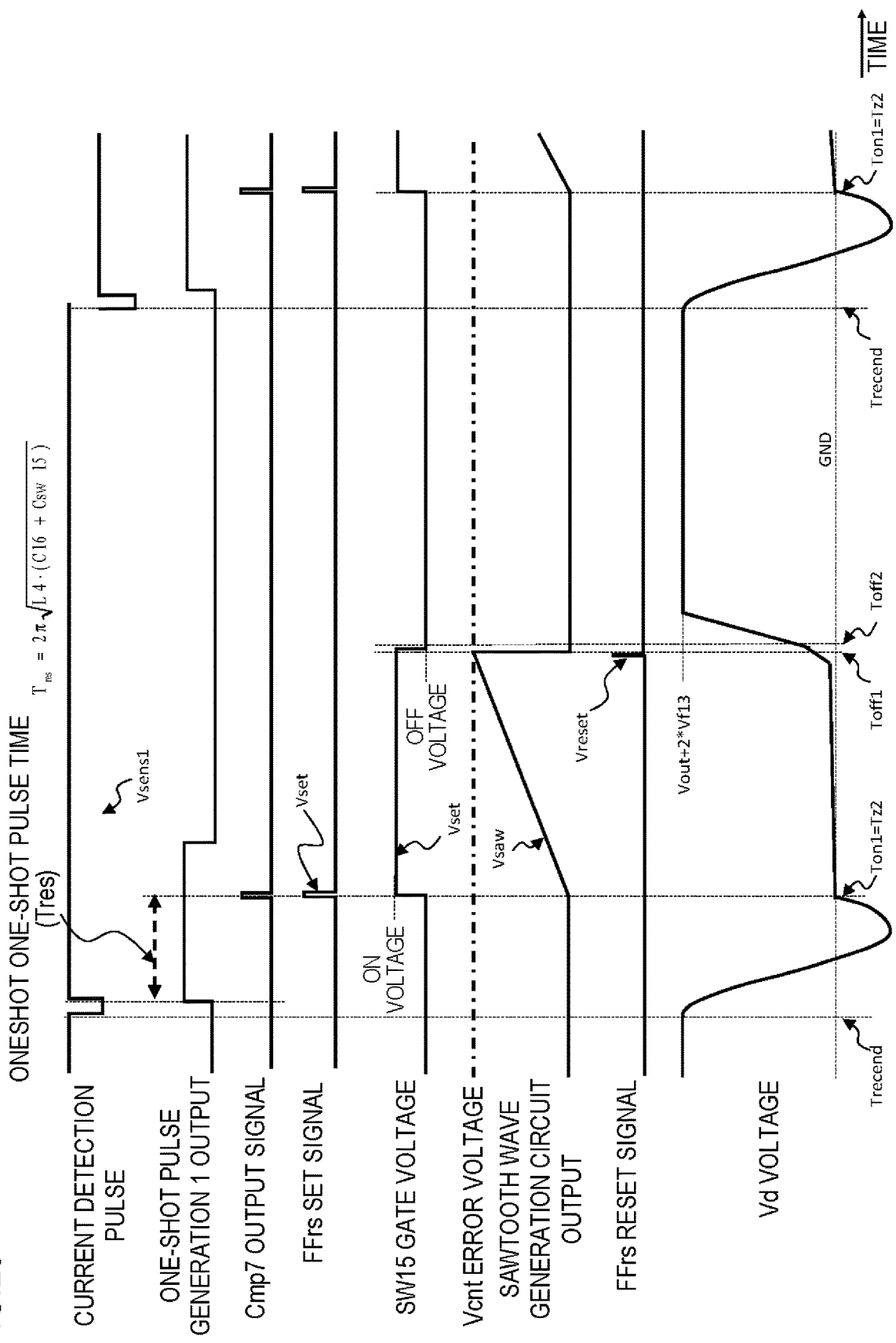
FIG. 26 is a waveform diagram illustrating the zero-voltage switching by the power supply device 103.

In order to realize the timing control described above, the one-shot pulse generation circuit OneShot1 in the control circuit CTRL92 generates the output of a timing waveform different from that of the one-shot pulse generation circuit OneShot in the control circuit CTRL91. Further, the logic circuit AND5 performs AND operation between the output of the one-shot pulse generation circuit OneShot1 and the output of the comparator Cmp7 (i.e. a comparison signal between the terminal voltages Vsw1 and Vsw2 appearing at terminals of the bidirectional switch SW15), so as to generate the set signal Vset. Using this set signal Vset, on timing of the bidirectional switch SW15 is determined. This manner is illustrated in FIG. 26. Note that Csw15 in the diagram denotes parasitic capacitance of the bidirectional switch SW15.

Note that similarly to the description of the first embodiment, the voltage across terminals of the coil L4 is boosted and rectified by the first rectifier BD13, so as to charge the output smoothing capacitor C7 in this method. Therefore, even if the rated voltage of the alternating-current input power AC1 is set to any voltage within a wide range, the zero-voltage switching can be performed, and heat generation due to switching of the bidirectional switch SW15 can be heat generation can be largely suppressed.

Fourth Embodiment

Figure 27:
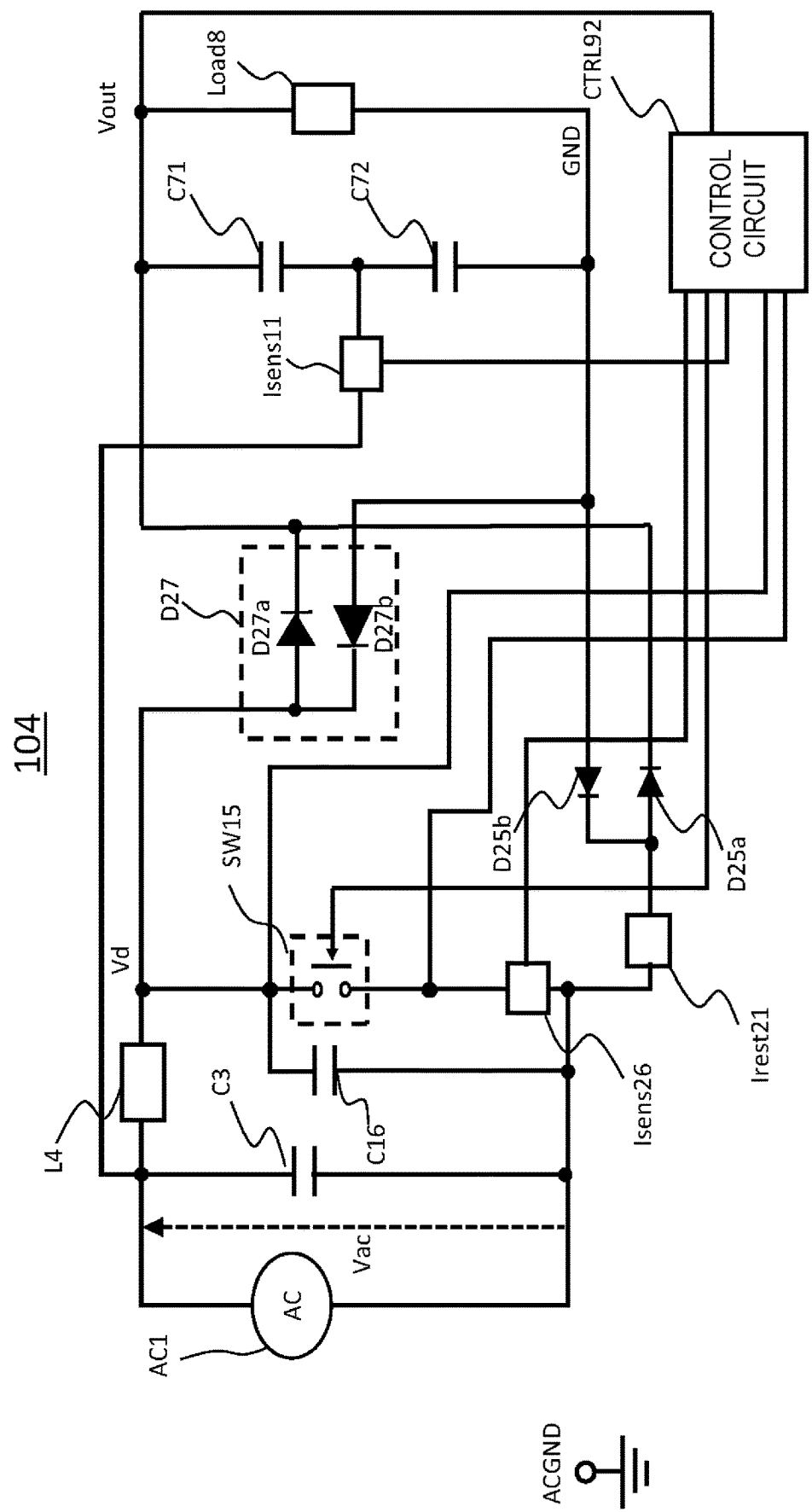
FIG. 27 is a diagram illustrating a power supply device 104 of a fourth embodiment.

FIG. 27 is a diagram illustrating a power supply device 104 according to a fourth embodiment of the present invention. D27 denotes a first rectifier constituted of fast recovery diodes D27a and D27b. C71 and C72 denote output smoothing capacitors, which are connected in series between the output terminal of the output voltage Vout and the ground terminal GND. Irest21 denotes a current limiting element, and D25a and D25b denote diodes constituting the second rectifier.

The first terminal of the input smoothing capacitor C3, the first terminal of the coil L4, and the first terminal of the current detector Isens11 are connected to the first terminal of the alternating-current input power AC1. The second terminal of the coil L4, the first terminal of the capacitor C16, and the first terminal of the bidirectional switch SW15 are connected to the anode of the fast recovery diode D27a and the cathode of the fast recovery diode D27b. The second terminal of the bidirectional switch SW15 is connected to the first terminal of the current detector Isens26. The second terminal of the input smoothing capacitor C3, the second terminal of the capacitor C16, the second terminal of the current detector Isens26, and the first terminal of the current limiting element Irest21 are connected to the second terminal of the alternating-current input power AC1. The second terminal of the current limiting element Irest21 is connected to the anode of the diode D25a and the cathode of the diode D25b. The cathodes of the fast recovery diode D27a and the diode D25a are connected to the first terminal of the output smoothing capacitor C71 and the first terminal of the output load Load8. The second terminal of the output smoothing capacitor C71 and the first terminal of the output smoothing capacitor C72 are connected to the second terminal of the current detector Isens11. The anodes of the fast recovery diode D27b and the diode D25b are connected to the second terminal of the output smoothing capacitor C72 and the second terminal of the output load Load8. The control terminal and both terminals of the bidirectional switch SW15, the signal output terminals of the current detectors Isens11 and Isens26, and the application terminal of the output voltage Vout are connected to the control circuit CTRL92.

In other words, the first terminal of the coil L4 is connected to the midpoint node of the output smoothing capacitor (i.e. connection node between the capacitors C71 and C72) via the current detector Isens11. The anode of the fast recovery diode D27a is connected to the second terminal of the coil L4, while the cathode thereof is connected to the output terminal of the output voltage Vout. The cathode of the fast recovery diode D27b is connected to the second terminal of the coil L4, while the anode thereof is connected to the ground terminal GND.

When the alternating-current input power AC1 is turned on so that the AC input voltage Vac becomes a positive potential, the charge voltage of the input smoothing capacitor C3 is increased, and current rectified by the second rectifier D25b via the current limiting element Irest21 charges the output smoothing capacitor C72. In this case, the current limiting element Irest21 suppresses rush current, and hence large current does not flow. On the other hand, when the AC input voltage Vac becomes a negative potential, the second rectifier D25a works, and appropriate current limited by the current limiting element Irest21 charges the output smoothing capacitor C71.

Note that the current limiting element Irest21 and the second rectifiers D25a and D25b work as the preliminary charging circuit. The effect of suppressing the rush current is the same as described above in the first embodiment, and the same effect can be obtained in the fourth embodiment, too.

When the output voltage Vout across terminals of the output smoothing capacitors C71 and C72 connected in series is raised by the preliminary charging circuit (Irest21, D25a, and D25b), the control circuit CTRL92 starts switching operation. The switching operation of the control circuit CTRL92 is appropriately set by comparing the divided voltage of the output voltage Vout with the reference voltage Vref4. In other words, in the same manner as description in the first embodiment, the control circuit CTRL92 compares the reference voltages Vref2 and Vref4 with the output voltage Vout, and the three operation modes (the preliminary charge operation, the current suppression switching operation, and the switching operation to follow the reference voltage Vref1) are switched while the rush current suppression and the increase speed control of the output voltage Vout can be performed.

When the output voltage Vout across terminals of the output smoothing capacitors C71 and C72 connected in series reaches the set voltage, the control circuit CTRL92 performs switching control so as to maintain the set voltage while consuming the load current to the output load Load8. In this case, in the fourth embodiment, in the same manner as the description of the first embodiment, the boosted voltage across terminals of the coil L4 is rectified by the first rectifier D27. Therefore, compared with the conventional structure (FIG. 1) in which the AC input voltage Vac is rectified by the rectifier BD2, current flowing in the first rectifier D27 can be reduced, and hence a loss due to the first rectifier D27 can be suppressed.

Note that each of the first embodiment (FIG. 12), the second embodiment (FIG. 22), and the third embodiment (FIG. 23) has only one output smoothing capacitor, and hence the boosted voltage across terminals of the output smoothing capacitor is the output voltage Vout. Therefore, when Vout is set to 400 V, it is always possible to perform zero-voltage switch-on within the voltage range (100 to 240 V) defined in all AC voltage standards in the world.

On the other hand, in the fourth embodiment (FIG. 27), even if the output voltage Vout is set to 400 V in the same manner, the voltage across terminals of the output smoothing capacitor C71 is boosted and rectified in a positive boosting case, while the voltage across terminals of the output smoothing capacitor C72 is boosted and rectified in a negative boosting case. Therefore, the voltages across terminals of the output smoothing capacitors C71 and C72 are 200 V each.

Figure 1:
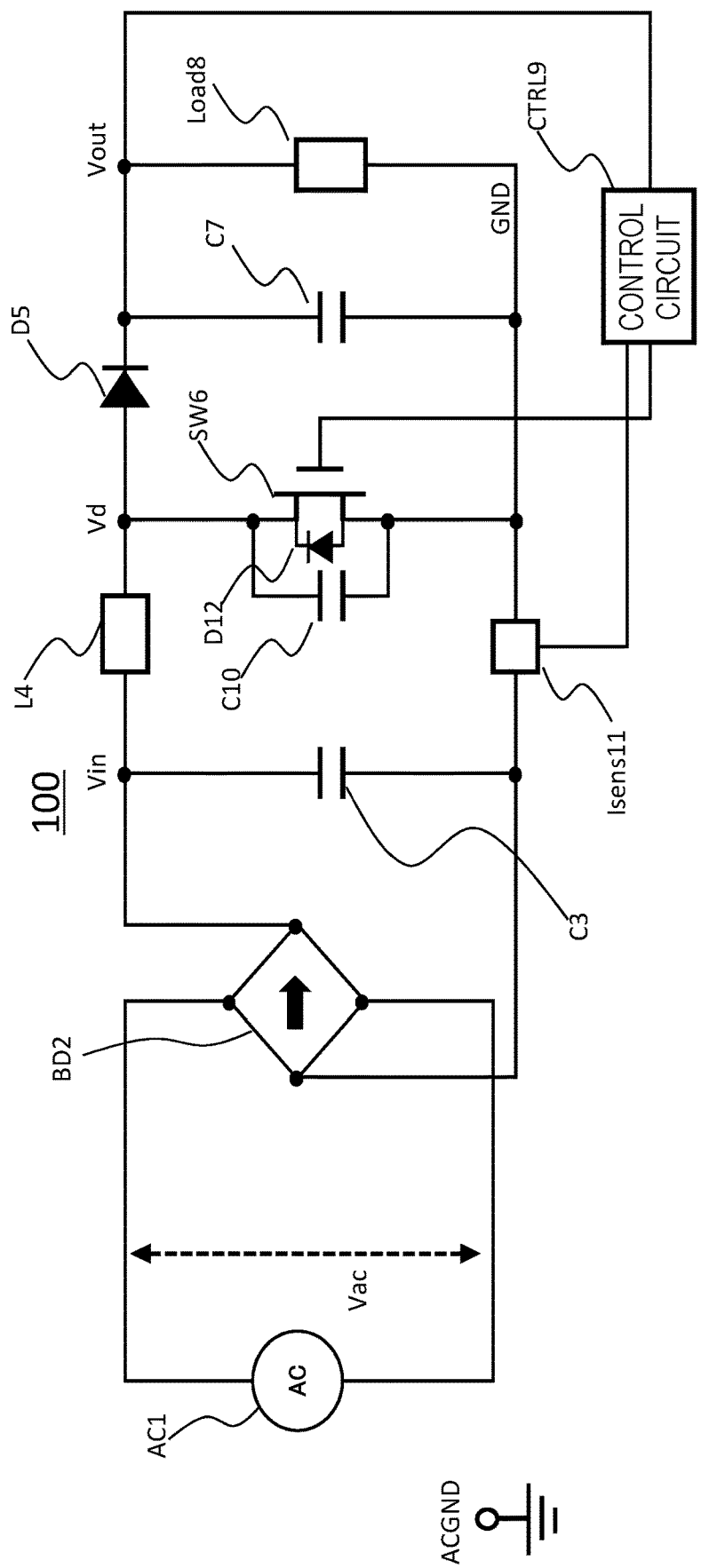
FIG. 1 is a diagram illustrating a conventional power supply device 100.
Figure 2:
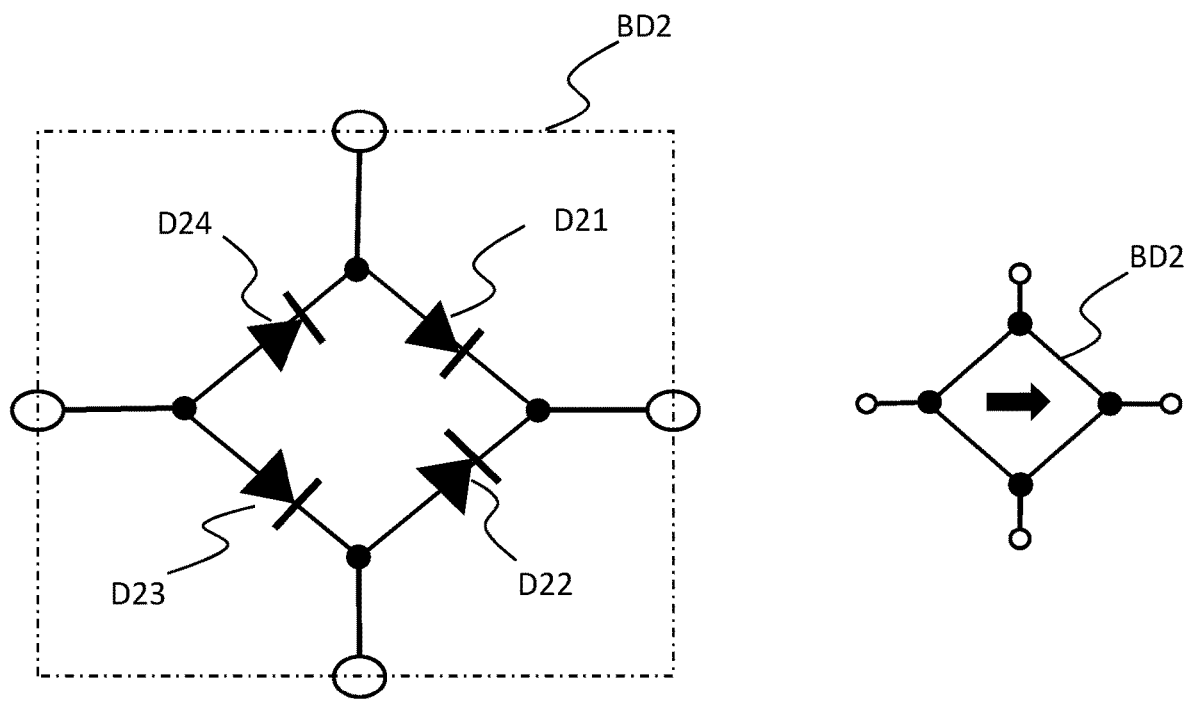
FIG. 2 is a diagram illustrating a structural example of a rectifier BD2.

In other words, when the AC input voltage Vac is 240 V and the Vacpeak is Vac=240×√2=339.4 V, the voltage Vd across terminals of the switch SW15 resonates with a center voltage of 339.4 V and an amplitude of 200 V, and hence zero voltage is not reached. However, when the switch is turned on at the lowest voltage of the resonance waveform, 339.4−200=139.4 V causes a loss ignoring the forward voltage of the first rectifier D27, while in the conventional structure (FIG. 1), 339.4−(400-339.4)=278.8 V. Therefore, it is certain that a loss can be suppressed also in the fourth embodiment more than in the conventional structure (FIG. 1).

In the fourth embodiment illustrated in FIG. 27, the output smoothing capacitors C71 and C72 are connected in series so that the two fast recovery diodes D27a and D27b are used as the first rectifier D27. In this structure, compared with the first embodiment, the second embodiment, or the third embodiment, a loss due to the first rectifier D27 is caused by the fast recovery diode of one stage, and hence power can be saved more. Of course, it is apparent that the first embodiment, the second embodiment, and the third embodiment can adopt the same structure.

Fifth Embodiment

In the fourth embodiment (FIG. 27), the output smoothing capacitors C71 and C72 are connected in series. When the AC input voltage Vac of the alternating-current input power AC is positive, boost charging of the output smoothing capacitor C71 is performed. When the AC input voltage Vac is negative, boost charging of the output smoothing capacitor C72 is performed. Therefore, the output smoothing capacitor that is boost-charged is switched at intervals of voltage polarity of the AC input voltage Vac (50 Hz×2 or 60 Hz×2).

In general, when capacitors connected in series are used as the output smoothing capacitor, voltages across terminals of the capacitors are set to be equal to each other so that voltage characteristics of the capacitors are in the same region. The output load Load8 is the resistance load Ro for convenience sake of description, but in reality power consumption is always changed as time goes on. Therefore, when the output load Load8 is changed at intervals of the AC input voltage Vac, the voltages across terminals of the output smoothing capacitors C71 and C72 may be different from each other. Therefore, a fifth embodiment is described below as an embodiment in which the voltages across terminals of the output smoothing capacitors C71 and C72 can be balanced.

Figure 28:
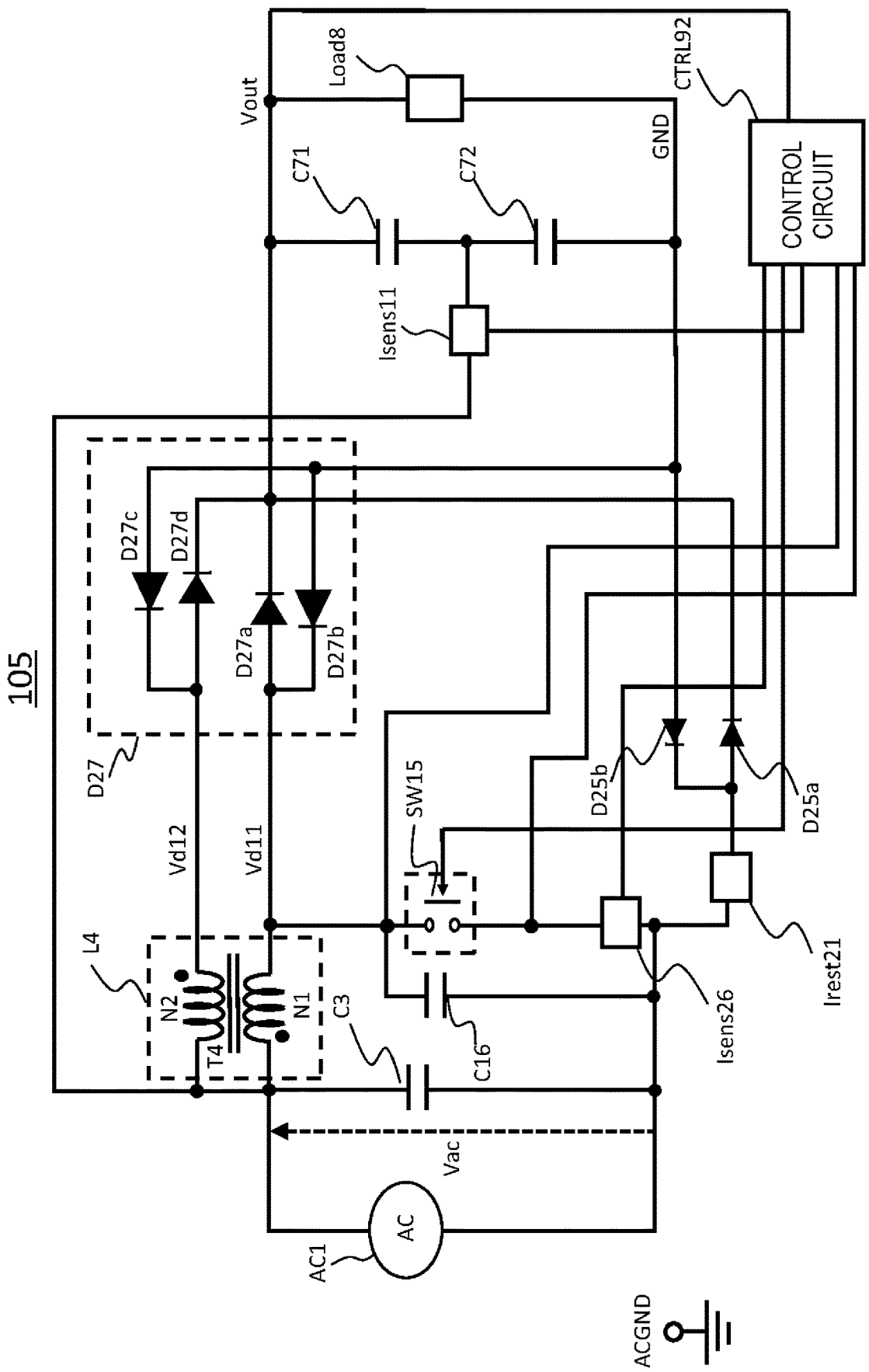
FIG. 28 is a diagram illustrating a power supply device 105 of a fifth embodiment.

FIG. 28 is a diagram illustrating a power supply device 105 according to a fifth embodiment of the present invention. L4 denotes a coil constituted of a transformer T4 including a first winding N1 and a second winding N2 that are connected in opposite directions to each other. Note that a turns ratio between the first winding N1 and the second winding N2 is N1:N2=1:1. Note that in the following description, the terminal voltage on the N1 side of the transformer T4 is denoted by Vd11, and the terminal voltage on the N2 side is denoted by Vd12. D27 denotes the first rectifier, which is constituted of fast recovery diodes D27a, D27b, D27c, and D27d.

The first terminal of the input smoothing capacitor C3, first terminals of the first winding N1 and the second winding N2, and the first terminal of the current detector Isens11 are connected to the first terminal of the alternating-current input power AC1. A second terminal of the first winding N1, the first terminal of the capacitor C16, and the first terminal of the bidirectional switch SW15 are connected to the anode of the fast recovery diode D27a and the cathode of the fast recovery diode D27b. The second terminal of the second winding N2 is connected to the cathode of the fast recovery diode D27c and the anode of the fast recovery diode D27d. The second terminal of the bidirectional switch SW15 is connected to the first terminal of the current detector Isens26. The second terminal of the input smoothing capacitor C3, the second terminal of the capacitor C16, the second terminal of the current detector Isens26, and the first terminal of the current limiting element Irest21 are connected to the second terminal of the alternating-current input power AC1. The second terminal of the current limiting element Irest21 is connected to the anode of the diode D25a and the cathode of the diode D25b. The cathodes of the fast recovery diodes D27a and D27d and the diode D25a are connected to the first terminal of the output smoothing capacitor C71 and the first terminal of the output load Load8. The second terminal of the output smoothing capacitor C71 and the first terminal of the output smoothing capacitor C72 are connected to the second terminal of the current detector Isens11. The anodes of the fast recovery diodes D27b and D27c and the diode D25b are connected to the second terminal of the output smoothing capacitor C72 and the second terminal of the output load Load8. The control terminal and both terminals of the bidirectional switch SW15, the signal output terminals of the current detectors Isens11 and Isens26, and the application terminal of the output voltage Vout are connected to the control circuit CTRL92.

In other words, the first terminals of the first winding N1 and the second winding N2 are connected to each other, and a connection node thereof is connected to the midpoint node of the output smoothing capacitor (i.e. the connection node between the capacitors C71 and C72) via the current detector Isens11. The anode of the fast recovery diode D27a is connected to the second terminal of the first winding N1, and the cathode thereof is connected to the output terminal of the output voltage Vout. The cathode of the fast recovery diode D27b is connected to the second terminal of the first winding N1, and the anode thereof is connected to the ground terminal GND. The cathode of the fast recovery diode D27c is connected to the second terminal of the second winding N2, and the anode thereof is connected to the ground terminal GND. The anode of the fast recovery diode D27d is connected to the second terminal of the second winding N2, and the cathode thereof is connected to the output terminal of the output voltage Vout.

When the alternating-current input power AC1 is turned on so that the AC input voltage Vac becomes a positive potential, the charge voltage of the input smoothing capacitor C3 is increased, and current rectified by the second rectifier D25b via the current limiting element Irest21 charges the output smoothing capacitor C72. In this case, the current limiting element Irest21 suppresses rush current, and hence large current does not flow. On the other hand, when the AC input voltage Vac becomes a negative potential, the second rectifier D25a works, and appropriate current limited by the current limiting element Irest21 charges the output smoothing capacitor C71.

Note that the current limiting element Irest21 and the second rectifiers D25a and D25b work as the preliminary charging circuit. The effect of suppressing the rush current is the same as described above in the first embodiment, and the same effect can be obtained in the fifth embodiment, too.

When the output voltage Vout across terminals of the output smoothing capacitors C71 and C72 connected in series is raised by the preliminary charging circuit (Irest21, D25a, and D25b), the control circuit CTRL92 starts switching operation. The switching operation of the control circuit CTRL92 is appropriately set by comparing the divided voltage of the output voltage Vout with the reference voltage Vref4. In other words, in the same manner as description in the first embodiment, the control circuit CTRL92 compares the reference voltages Vref2 and Vref4 with the output voltage Vout, and the three operation modes (the preliminary charge operation, the current suppression switching operation, and the switching operation to follow the reference voltage Vref1) are switched while the rush current suppression and the increase speed control of the output voltage Vout can be performed.

When the output voltage Vout across terminals of the output smoothing capacitors C71 and C72 connected in series reaches the set voltage, the control circuit CTRL92 performs switching control so as to maintain the set voltage while consuming the load current to the output load Load8.

When the bidirectional switch SW15 is turned off, if the AC input voltage Vac is positive, the terminal voltage Vd11 on the N1 side is raised to the positive side, and when it exceeds the voltage across terminals of the output smoothing capacitor C71, boost rectification is performed via the fast recovery diode D27a. In addition, when the turns ratio of the transformer T4 constituting the coil L4 is set as N1/N2=1, the terminal voltage Vd12 on the N2 side is dropped to a voltage level having polarity opposite to that of the terminal voltage Vd11 on the N1 side with the same absolute value, and when it exceeds the voltage across terminals of the output smoothing capacitor C72, boost rectification is performed via the fast recovery diode D27c.

In the same manner, when the bidirectional switch SW15 is turned off, if the AC input voltage Vac is negative, the terminal voltage Vd11 on the N1 side is dropped to the negative side, and when it exceeds the voltage across terminals of the output smoothing capacitor C72, boost rectification is performed via the fast recovery diode D27b. In addition, the terminal voltage Vd12 on the N2 side is raised to a voltage level having polarity opposite to that of the terminal voltage Vd11 on the N1 side with the same absolute value, and when it exceeds the voltage across terminals of the output smoothing capacitor C71, boost rectification is performed via the fast recovery diode D27d.

As described above, the output smoothing capacitors C71 and C72 are charged equally between terminals both in positive and negative cases of the AC input voltage Vac, and hence the voltages across terminals are balanced.

In this case, in the same manner as the description of the first embodiment, the terminal voltages Vd11 and Vd12 of the transformer T4 are boosted and rectified by the first rectifier D27. Therefore, compared with the conventional structure (FIG. 1) in which the AC input voltage Vac is rectified by the rectifier BD2, current flowing in the first rectifier D27 can be reduced, and hence a loss due to the first rectifier D27 is suppressed.

Sixth Embodiment

Figure 29:
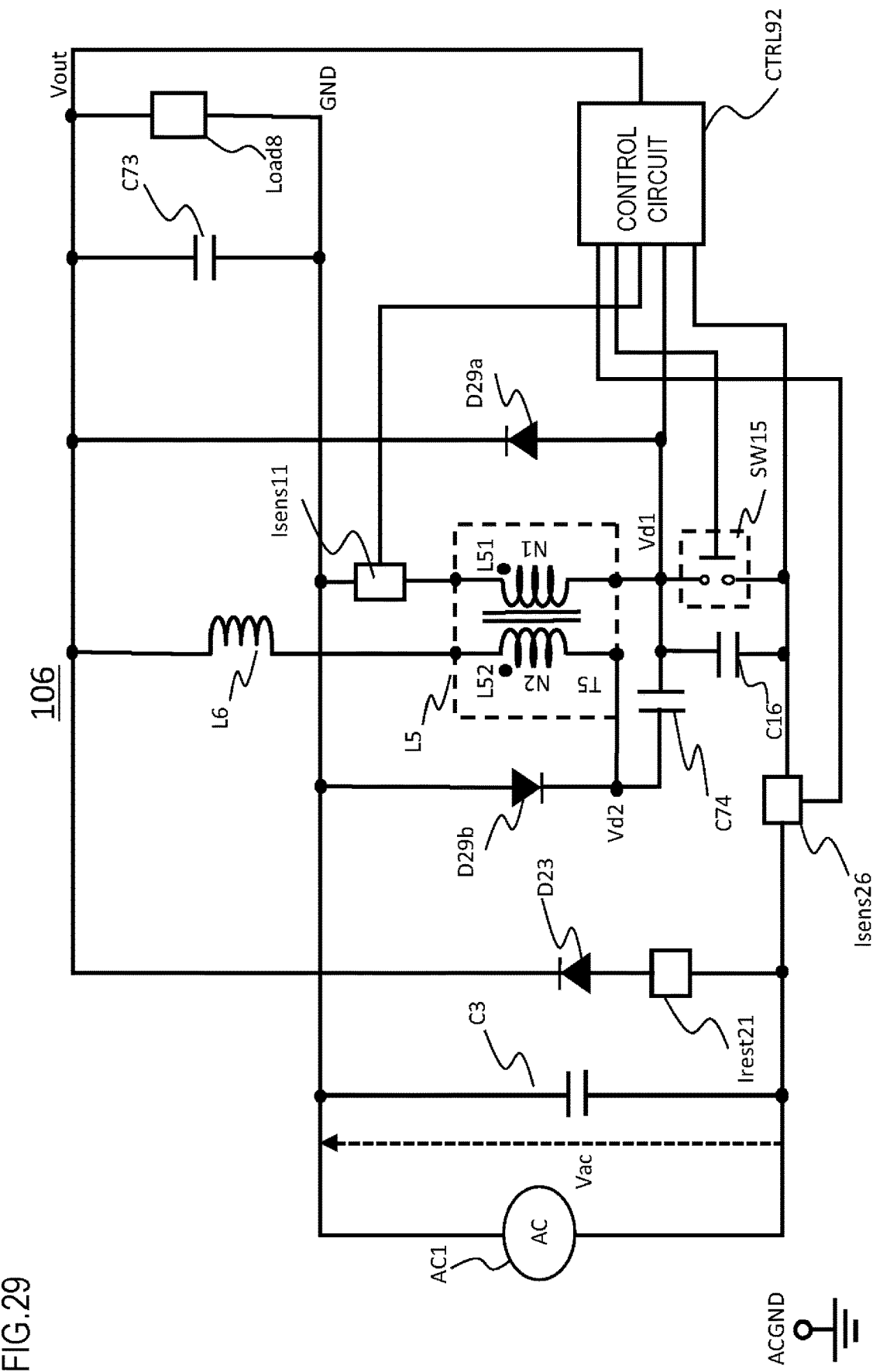
FIG. 29 is a diagram illustrating a power supply device 106 of a sixth embodiment.

FIG. 29 illustrates a power supply device 106 according to a sixth embodiment of the present invention. L5 is a coil, which is constituted of a transformer T5 including coils L51 and L52. N1 and N2 denote turns of windings of the transformer T5, and N1/N2=1 holds. D29a and D29b denote the first rectifiers, each of which is constituted of a fast recovery diode. L6 denotes a coil. C73 and C74 denote output smoothing capacitors. In addition, the ground potential as the reference potential of the circuit constituting the control circuit CTRL92 is connected to one terminal of the alternating-current input power AC1 shown as GND in FIG. 29.

The first terminal of the coil L6, the cathode of the first rectifier D29a, the first terminal of the output smoothing capacitor C73, and the first terminal of the output load Load8 are connected to the cathode of the second rectifier D23. The first terminal of the input smoothing capacitor C3, the anode of the first rectifier D29b, the first terminal of the current detector Isens11, the second terminal of the output smoothing capacitor C73, and the second terminal of the output load Load8 are connected to the first terminal of the alternating-current input power AC1. The anode of the second rectifier D23 is connected to the first terminal of the current limiting element Irest21. The second terminal of the input smoothing capacitor C3, the second terminal of the current limiting element Irest21, and the first terminal of the current detector Isens26 are connected to the second terminal of the alternating-current input power AC1. The second terminal of the coil L6 is connected to a first terminal of the coil L52. A second terminal of the coil L52 and the cathode of the first rectifier D29b are connected to a first terminal of the output smoothing capacitor C74. The second terminal of the current detector Isens11 is connected to a first terminal of the coil L51. A second terminal of the coil L51, the anode of the first rectifier D29a, a second terminal of the output smoothing capacitor C74, and the first terminal of the capacitor C16 are connected to the first terminal of the bidirectional switch SW15. The second terminal of the current detector Isens26 is connected to the second terminal of the capacitor C16 and the second terminal of the bidirectional switch SW15. The control terminal and both terminals of the bidirectional switch SW15, the signal output terminals of the current detectors Isens11 and Isens26, and the application terminal of the output voltage Vout are connected to the control circuit CTRL92.

When the state before the alternating-current input power AC1 is connected is changed to the state where the alternating-current input power AC1 is connected, the bidirectional switch SW15 is turned off. In this case, when the AC input voltage Vac of the alternating-current input power AC1 is changed to negative, the current rectified by the second rectifier D23 via the current limiting element Irest21 charges the output smoothing capacitor C73. In addition, terminals of the output smoothing capacitor C74 are DC-connected to terminals of the output smoothing capacitor C73 via the coils L6, L52, and L51. Therefore, the voltage across terminals of the output smoothing capacitor C74 is changed together with the voltage across terminals of the output smoothing capacitor C73. In this case, the current limiting element Irest21 suppresses rush current, and hence large current does not flow. The effect of suppressing the rush current is the same as described above in the first embodiment, and the same effect can be obtained in the sixth embodiment, too.

The voltages across terminals of the output smoothing capacitors C73 and C74 connected in parallel via the coils L6, L52, and L51 are increased by the preliminary charging circuit (Irest21 and D23), and the control circuit CTRL92 starts switching operation. The switching operation of the control circuit CTRL92 is appropriately set by comparing the voltage across terminals of the output smoothing capacitor C73, i.e. the output voltage Vout with the reference voltage Vref4. In other words, in the same manner as description in the first embodiment, the control circuit CTRL92 compares the output voltage Vout with the reference voltages Vref2 and Vref4, and the three operation modes (the preliminary charge operation, the current suppression switching operation, and the switching operation to follow the reference voltage Vref1) are switched while the rush current suppression and the increase speed control of the output voltage Vout can be performed.

When the output voltage Vout across terminals of the output smoothing capacitor C73 reaches the set voltage, the control circuit CTRL92 performs switching control so as to maintain the set voltage while consuming the load current to the output load Load8.

In this case, during an off period of the bidirectional switch SW15, if the AC input voltage Vac is positive, the terminal voltage Vd1 is raised to the positive side, and when it exceeds the voltage across terminals of the output smoothing capacitor C73, boost rectification is performed via the first rectifier D29a.

On the other hand, during an off period of the bidirectional switch SW15, if the AC input voltage Vac is negative, the terminal voltage Vd1 is dropped to the negative side, and the terminal voltage Vd2 is decreased along with the terminal voltage Vd1 due to the other output smoothing capacitor C74. When the terminal voltage Vd1 becomes lower than −Vout+Vac, the terminal voltage Vd2 becomes lower than −Vac, and the rectification operation is performed with respect to the output smoothing capacitor C74 via the first rectifier D29b.

When the rectification operation is finished, energy charged to the output smoothing capacitor C74 is supplied to the output smoothing capacitor C73 via the coil L52 and the coil L6 for smoothing, and before long the voltages across terminals of the output smoothing capacitors C73 and C74 become equal to each other.

As described above, the voltages across terminals of the output smoothing capacitors C73 and C74 are equal to each other as DC voltages both in positive and negative cases of the AC input voltage Vac. In this case, similarly to the description of the first embodiment, the rectification operation by the first rectifiers D29a and D29b is the boost rectification operation. Therefore, current flowing in the first rectifiers D29a and D29b (corresponding to power consumption of the output load Load8) is suppressed more than that in the conventional structure (FIG. 1) in which the AC input voltage Vac is rectified by the rectifier BD2, and hence a loss due to the first rectifiers D29a and D29b can be suppressed.

In addition, in the sixth embodiment, similarly to the first embodiment, the second embodiment, and the third embodiment, the output smoothing capacitors C73 and C74 can be regarded as a single capacitor. Therefore, the boosted and rectified voltage of the terminal voltage Vd1 or Vd2 is the output voltage Vout regardless of the state of the AC input voltage Vac. Therefore, when Vout is set to 400 V, it is always possible to perform zero-voltage switch-on within a range of all AC input voltage standards in the world (100 to 240 V).

In addition, in the sixth embodiment, the output smoothing capacitors C73 and C74 preferably have sufficiently low impedance at the switching frequency and backup energy at a commercial frequency. With this structure, it is not necessary that the output smoothing capacitors C73 and C74 have the same capacitance, and they can have individual capacitance values. In addition, the coils L51 and L52 may be constituted as the transformer T5 having a turns ratio of substantially 1:1, but it is needless to say that they may be constituted as independent coils as long as the coils have appropriately determined inductances, so that the same operation can be performed.

Variations

Note that in the first embodiment and the second embodiment, the structure is exemplified in which the pair of switching elements SW14a and SW14b are controlled at individual timings (i.e. the structure in which one of them is always turned on while the other is switching-controlled), but it is possible to adopt a structure in which the switching elements SW14a and SW14b are switching-controlled at the same timing similarly to the third to fifth embodiments using the bidirectional switch SW15.

Figure 30:
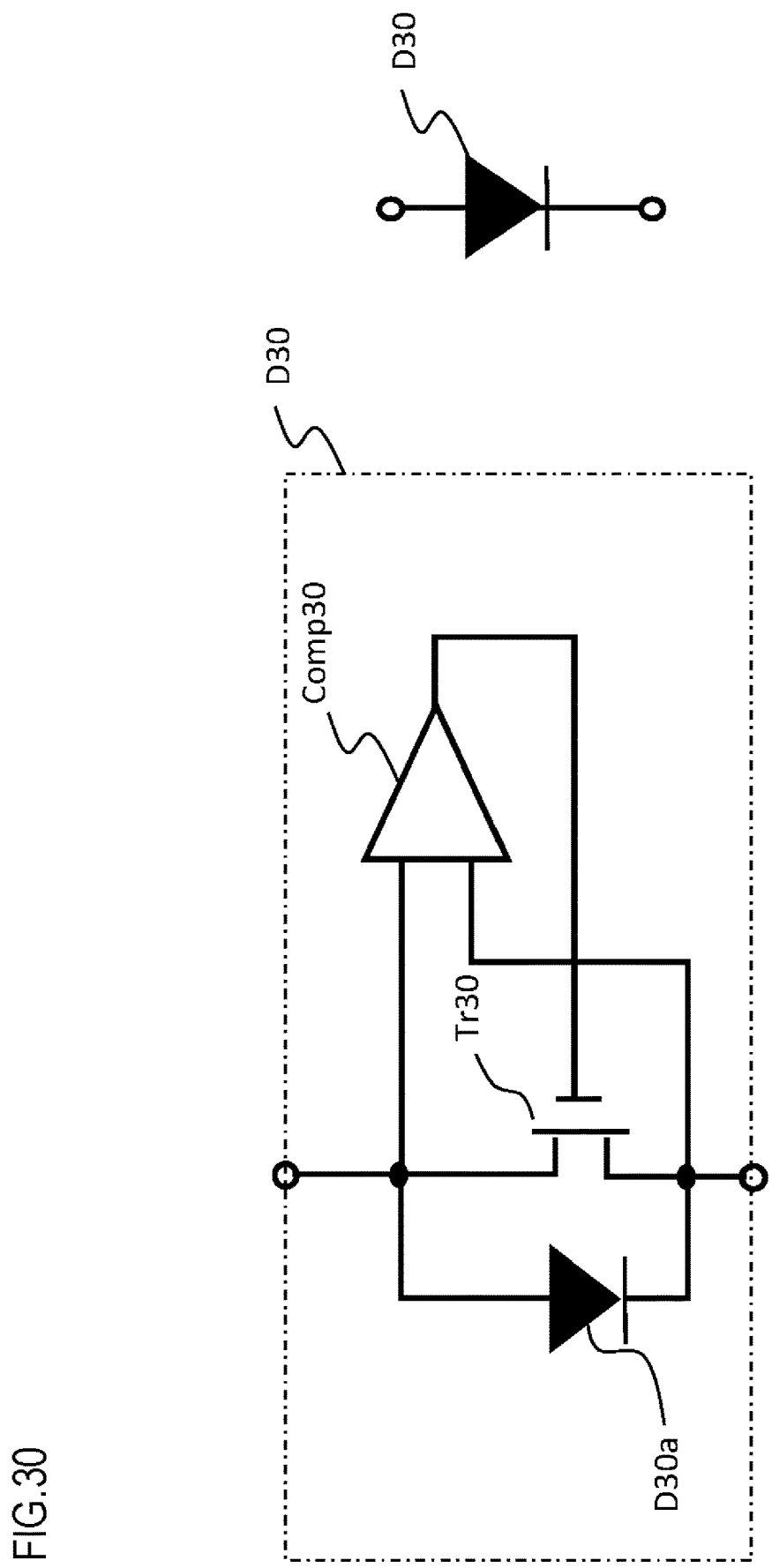
FIG. 30 is a diagram illustrating a structural example of a synchronous rectifying element D30.

In addition, in the first embodiment, the second embodiment, the third embodiment, the fourth embodiment, the fifth embodiment, and the sixth embodiment, it is needless to say that the fast recovery diodes (D131 to D134, D27a to D27d, and D29a to D29b) for performing boost rectification may be a so-called synchronous rectifying element D30 constituted of a fast recovery diode D30a, a transistor switch Tr30, and its control comparator Comp30, as illustrated in FIG. 30.

Summary

The various embodiments disclosed in this specification are summarized below.

The invention disclosed in this specification relates to, for example, a power supply device having a power factor improvement function, and particularly to an effective technique for improving power conversion efficiency and suppressing rush current when power is turned on, in a power supply device that is supplied with a commercial AC power and outputs a stable DC voltage set to a voltage higher than a peak value of the AC input voltage.

Conventionally, a power supply device having a power factor improvement function has a problem that rush current flows to an input smoothing capacitor when power is turned on.

Therefore, one of the main objects of the invention disclosed in this specification is to provide a preliminary charging path from the alternating-current input power to the output using a current limiting element and a rectifier so as to suppress rush current, by connecting a switch and a coil in series with the alternating-current input power so that a voltage across terminals of the coil is boosted and rectified.

In addition, if the rated voltage of the alternating-current input power is high (e.g. higher than 220 V), the voltage across terminals of the switching element does not drop below 0 V even if it resonates, and hence there is also a problem that zero-voltage switching cannot be performed so that power efficiency cannot be optimized.

Therefore, one of the main objects of the invention disclosed in this specification is to perform boost rectification of the voltage across terminals of the coil so as to perform resonance control of the drain voltage of the switching element even if the rated voltage of the alternating-current input power is high, and thus to perform zero-voltage switching of the switching element, for optimizing a loss of the switching element.

Further, if the rated voltage of the alternating-current input power is low, because current flowing in the rectifier is large, a loss is increased due to a loss voltage of the rectifier, and there is a problem that the power efficiency is largely affected.

Therefore, one of the main objects of the invention disclosed in this specification is to limit current flowing in the rectifier even if the rated voltage of the alternating-current input power is low, so as to suppress its heat generation, and thus to suppress a loss.

Summarizing the above, the invention disclosed in this specification can be said to provide the power supply device that enables suppression of rush current when power is turned on, enables zero-voltage switching of the switching element even if the input voltage is high, and further enables to optimize power efficiency by boosting and rectifying the coil exciting current at high voltage across terminals of the coil and by setting large ratio of the rectified voltage to a loss voltage of the rectifying diode.

Further, in order to solve the above problem, the power supply device disclosed in this specification includes the coil and the switch (the switching element or the bidirectional switch) connected in series with the alternating-current input power, in which the voltage across terminals of the coil is boosted and rectified to charge the voltage across terminals of the output smoothing capacitor, so that the DC output voltage is generated.

In addition, the power supply device disclosed in this specification includes the control circuit that controls to turn on the switch so that input current proportional to the AC input voltage flows, to turn off the switch so that the coil exciting current is boosted and rectified via the first rectifier and is supplied to the output smoothing capacitor, to supply current to the output load, and to stabilize the output voltage.

Even if the alternating-current input power is a low voltage standard, by setting the voltage across terminals of the output smoothing capacitor to a high voltage, current flowing in the first rectifier is decreased, and a loss due to a loss voltage of the first rectifier can be suppressed.

Further, when the coil exciting current finishes flowing in the output smoothing capacitor via the first rectifier, the voltage across terminals of the coil starts to resonate. Then, the control circuit turns on the switching element at an appropriate timing so that zero-voltage switching can be performed, and hence a loss can be suppressed.

In addition, adopting the structure in which the output smoothing capacitor is charged from the alternating-current input power via the preliminary charging circuit constituted of the current limiting element and the second rectifier, the rush current flowing when power is turned on can be suppressed. Further, when the AC input voltage becomes a steady voltage, the preliminary charging path does not work, a loss of the current limiting element in a steady voltage output is eliminated. In addition, it is possible to reduce the number of components by adopting a half-wave rectification structure of the preliminary charging circuit.

Even if the rated voltage of the alternating-current input power is low, heat generation of the first rectifier due to an increase in current compared with a case of a high rated voltage of the alternating-current input power can be suppressed by a boost rectifier using a coil, and hence a loss of the first rectifier can be suppressed.

In addition, the invention disclosed in this specification performs the switching control so that the coil, the parasitic capacitance accompanying coil-side terminals of the switch, and a noise reducing capacitor connected to terminals of the switch perform resonance operation when the switch is turned off, and thus suppresses heat generation of the switch when the switch is turned on next time.

In addition, the invention disclosed in this specification performs the switching control so that the voltage across terminals of the switch becomes zero-voltage when the switch is turned on, and hence suppresses heat generation of the switch when the switch is turned on.

As described above, according to the invention disclosed in this specification, rush current when power is turned on can be suppressed. Even if the rated voltage of the alternating-current input power is low, power efficiency is not decreased compared with a case of a high rated voltage. Further, even if the rated voltage of the alternating-current input power is high, resonance control of the drain voltage of the switching element is performed so that the zero-voltage switching of the switching element is performed. Thus it is possible to provide the power supply device that can prevent power efficiency from decreasing.

Other Variations

Note that other than the embodiments described above, various technical features disclosed in this specification can be variously modified within the scope of the technical invention without deviating from the spirit thereof. In other words, the embodiments described above are merely examples in every aspect and should not be interpreted as limitations. The technical scope of the present invention is not limited to the embodiments described above and should be understood to include all modifications within meanings and scopes equivalent to the claims.

INDUSTRIAL APPLICABILITY

The invention disclosed in this specification can be applied to power supply devices mounted in various electric devices.

What is claimed is:
1. A power supply device comprising:
a coil of which a first terminal is connected to an alternating-current input power;
a first switching element of which a first terminal is connected to a second terminal of the coil,
a second switching element of which a first terminal is connected to a second terminal of the first switching element,
a first rectifier of which a first input terminal is connected to the first terminal of the coil, a second input terminal is connected to the second terminal of the coil, and
an output smoothing capacitor of which a first terminal is connected to a first output terminal of the first rectifier, a second terminal is connected to a second output terminal of the first rectifier, wherein
the first rectifier is a diode bridge including:
a first diode including an anode connected to the first input terminal, and including a cathode connected to the first output terminal,
a second diode including an anode connected to the second input terminal, and including a cathode connected to the first output terminal,
a third diode including an anode connected to the second output terminal, and including a cathode connected to the second input terminal, and
a fourth diode including an anode connected to the second output terminal, and including a cathode connected to the first input terminal, and wherein
the first rectifier is operable to perform boost rectification to charge a voltage across terminals of the output smoothing capacitor so that output power is obtained, and wherein
the first switching element, the second switching element and the coil are disposed on the alternating-current input power side of the first rectifier.

2. The power supply device according to claim 1, wherein the first switching element and the second switching element are components of a bidirectional switch.

3. The power supply device according to claim 1, further comprising a preliminary charging circuit including a current limiting element and a second rectifier, wherein preliminary charge is performed from one terminal or both terminals of the alternating-current input power to the output smoothing capacitor via the preliminary charging circuit.

4. The power supply device according to claim 2, further comprising a control circuit arranged to perform switching control so that the bidirectional switch is turned on at timing when voltage across terminals of the bidirectional switch becomes zero or timing when the voltage is clamped at a predetermined value.

5. The power supply device according to claim 2, wherein the power supply device has a power factor improvement function to perform switching control of the bidirectional switch so that a phase difference between an input current waveform and an input voltage waveform is eliminated.

* * * * *